United States Patent [19]

Hoyt

[11] Patent Number: 4,844,629
[45] Date of Patent: Jul. 4, 1989

[54] ELECTRONIC LABELER WITH PRINTHEAD AND WEB SENSOR COMBINED FOR CONCURRENT TRAVEL, AND ASSEMBLIES OF IDENTIFICATION DEVICES THEREFOR

[75] Inventor: Steven D. Hoyt, Lake Geneva, Wis.
[73] Assignee: W. H. Brady Co., Milwaukee, Wis.
[21] Appl. No.: 92,961
[22] Filed: Sep. 3, 1987
[51] Int. Cl.⁴ .................. B41J 15/08; B41J 29/42
[52] U.S. Cl. .................. 400/583.3; 101/288; 400/708
[58] Field of Search .............. 400/70, 583.3, 581, 400/708, 73; 101/288; 226/45, 27

[56] References Cited

U.S. PATENT DOCUMENTS

| | | | |
|---|---|---|---|
| 3,503,834 | 3/1970 | Schroter | 400/583.3 |
| 3,566,132 | 2/1971 | Walker | 226/45 |
| 3,567,091 | 3/1971 | Wodlard | 226/45 |
| 3,949,856 | 4/1976 | Ulber et al. | 226/45 |
| 4,025,025 | 5/1977 | Bartel et al. | 226/45 |
| 4,120,245 | 10/1978 | Karp et al. | 101/288 |
| 4,255,064 | 3/1981 | Kelly | 400/708 |
| 4,264,396 | 4/1981 | Stewart | 101/93.04 |
| 4,272,204 | 9/1981 | Quinn, Jr. et al. | 400/708 |
| 4,314,757 | 2/1982 | Anderson et al. | 226/45 |
| 4,364,503 | 12/1982 | Ivary et al. | 226/45 |
| 4,386,860 | 6/1983 | Price et al. | 101/288 |
| 4,407,692 | 10/1983 | Torbeck | 156/350 |
| 4,440,248 | 4/1984 | Teraoka | 177/4 |
| 4,473,426 | 9/1984 | Goodwin et al. | 156/384 |
| 4,477,305 | 10/1984 | Hamisch, Jr. et al. | 156/384 |
| 4,479,843 | 10/1984 | Neuhard et al. | 156/384 |
| 4,485,949 | 12/1984 | Gebhart et al. | 226/45 |
| 4,488,671 | 12/1984 | Hamisch, Jr. | 226/79 |
| 4,490,206 | 12/1984 | Makley | 156/384 |
| 4,497,682 | 4/1985 | Hamisch, Jr. | 156/384 |
| 4,498,947 | 2/1985 | Hamisch, Jr. et al. | 156/384 |
| 4,501,224 | 2/1985 | Shibayama et al. | 118/697 |
| 4,511,422 | 4/1985 | Hamisch, Jr. et al. | 156/384 |
| 4,540,299 | 9/1985 | Yamada | 400/708 |
| 4,544,434 | 10/1985 | Mistyurik | 156/384 |
| 4,556,442 | 12/1985 | Torbeck | 156/350 |
| 4,561,926 | 12/1985 | Hamisch, Jr. et al. | 156/381 |
| 4,579,466 | 4/1986 | Sato et al. | 400/693 |
| 4,584,047 | 4/1986 | Vanderpool et al. | 156/361 |
| 4,584,048 | 4/1986 | Hamisch, Jr. et al. | 156/384 |
| 4,598,780 | 7/1986 | Iwasaki et al. | 101/288 |
| 4,630,538 | 12/1986 | Cushman | 101/45 |
| 4,655,129 | 4/1987 | Wirth et al. | 400/70 |
| 4,680,078 | 7/1987 | Vanderpool et al. | 156/352 |

FOREIGN PATENT DOCUMENTS

| | | | |
|---|---|---|---|
| 118891 | 9/1981 | Japan | 101/288 |
| 7985 | 1/1986 | Japan | 400/61 |
| 2114060 | 8/1983 | United Kingdom | 400/61 |

OTHER PUBLICATIONS

Brochure of W. H. Brady Co., "The Bradywriter II Industrial Printer", 1986.
Hewlett Packard Application Note 1008, "Optical Sensing for the HEDS-1000", date unknown but prior to 9/3/86.
Brochure of Monarch Marking, "Monarch Pathfinder Portable, Controlled Printing System," 1984.
Brochure of Thomas & Betts Corporation, "E-Z Coder Wire Marker Printer", 1985.
Brochure of W. H. Brady Co., "Bradywriter Industrial Printing System", 1985.

Primary Examiner—William Pieprz
Attorney, Agent, or Firm—Quarles & Brady

[57] ABSTRACT

An electronic labeling machine is disclosed which includes a printing mechanism with a carriage adapted for horizontal travel across assemblies of identification devices to be imprinted. A web sensor is attached to the carriage for concurrent travel therewith. In traversing horizontally across the assembly, the web sensor provides a signal to a microprocessor which indicates the presence or absence of the assembly under the current position of the sensor. The microprocessor also receives a timing signal from the printing mechanism indicative of the position of the carriage. Based on the timing signal and the signal from the web sensor, the microprocessor measures a current width of the assembly. The assembly is especially adapted for use with the invention, and includes notched portions having a width different than the nominal assembly width, each notched portion being in a fixed relative position with respect to one of the identification devices. The microprocessor is thereby able control feeding of the assembly to register the identification devices for printing by discriminating the current measured width of the assembly between the nominal width and the width at a notch.

11 Claims, 12 Drawing Sheets

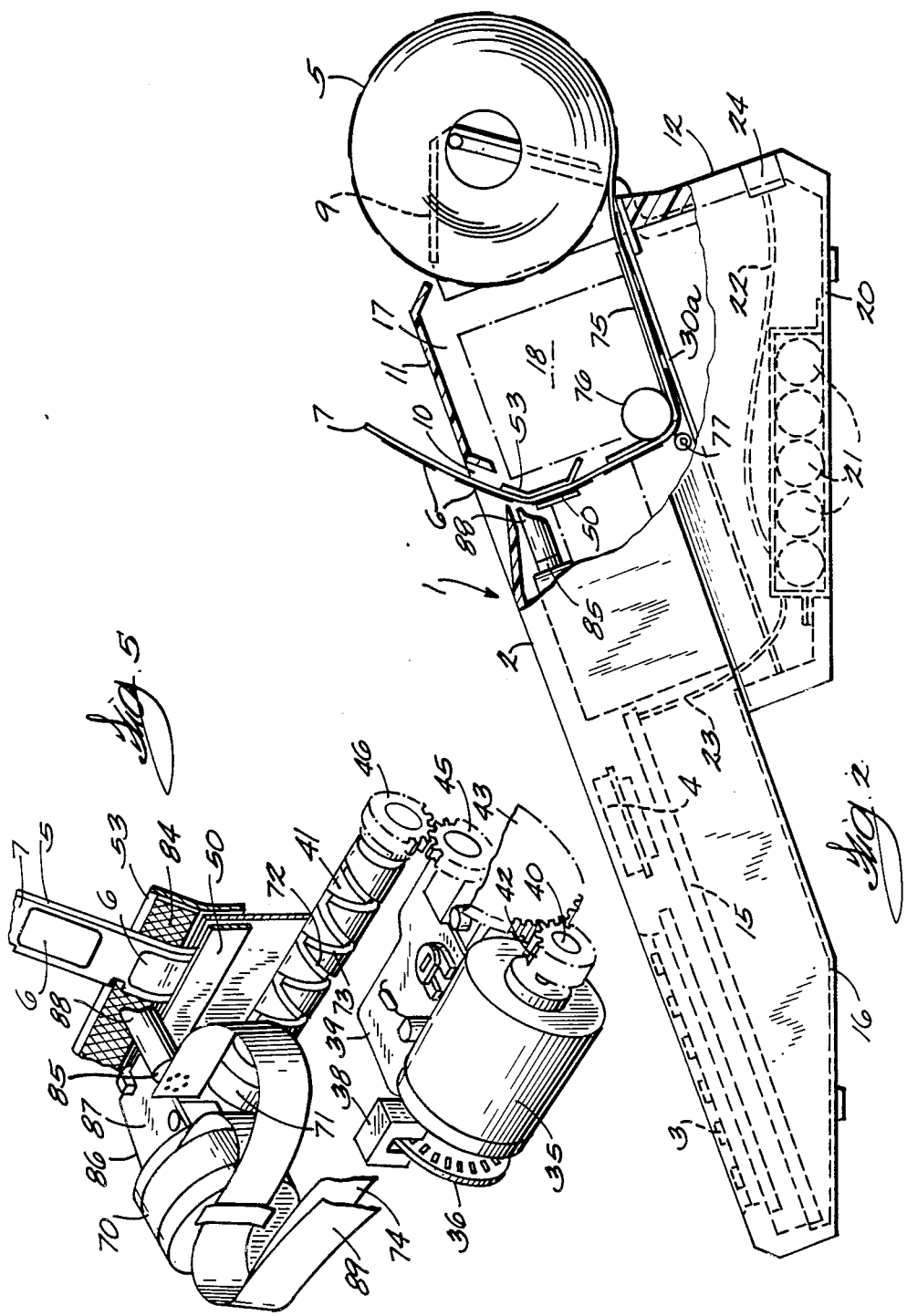

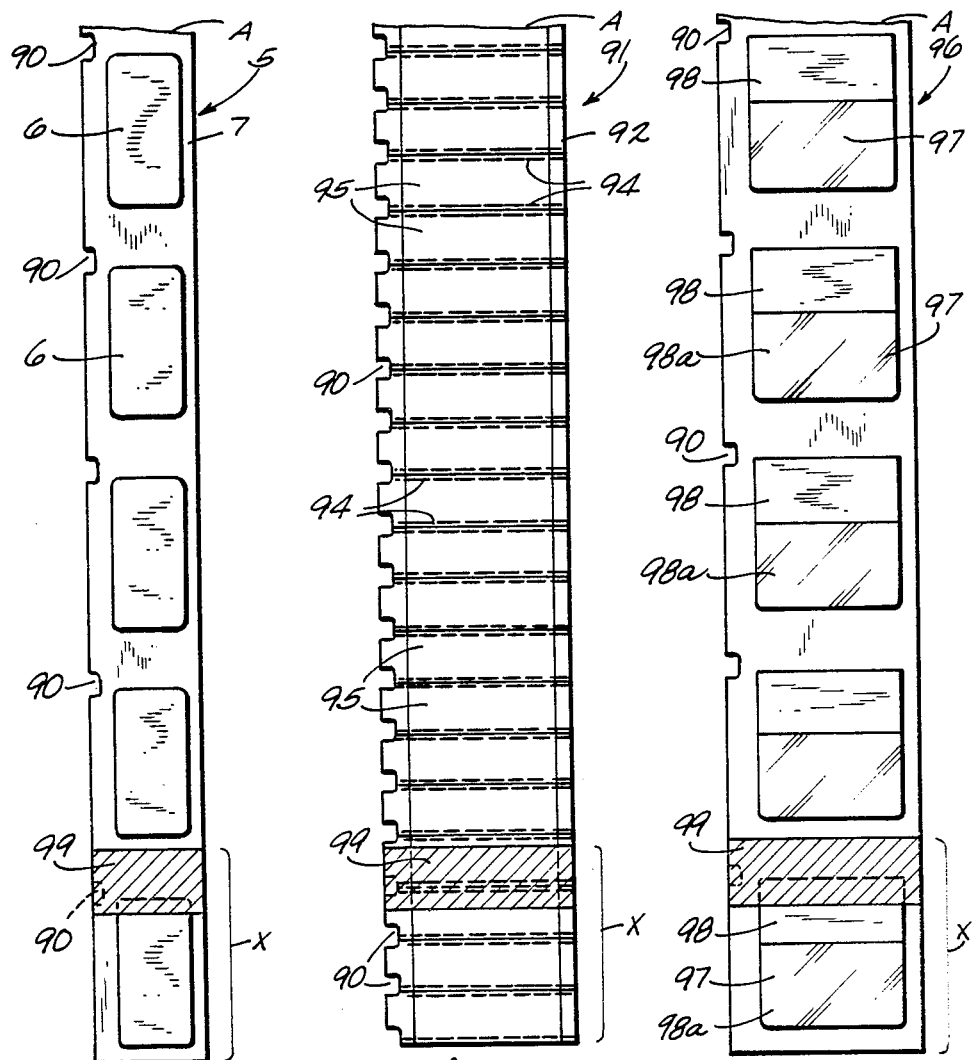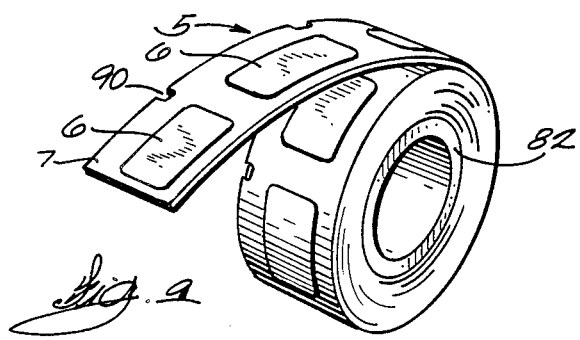

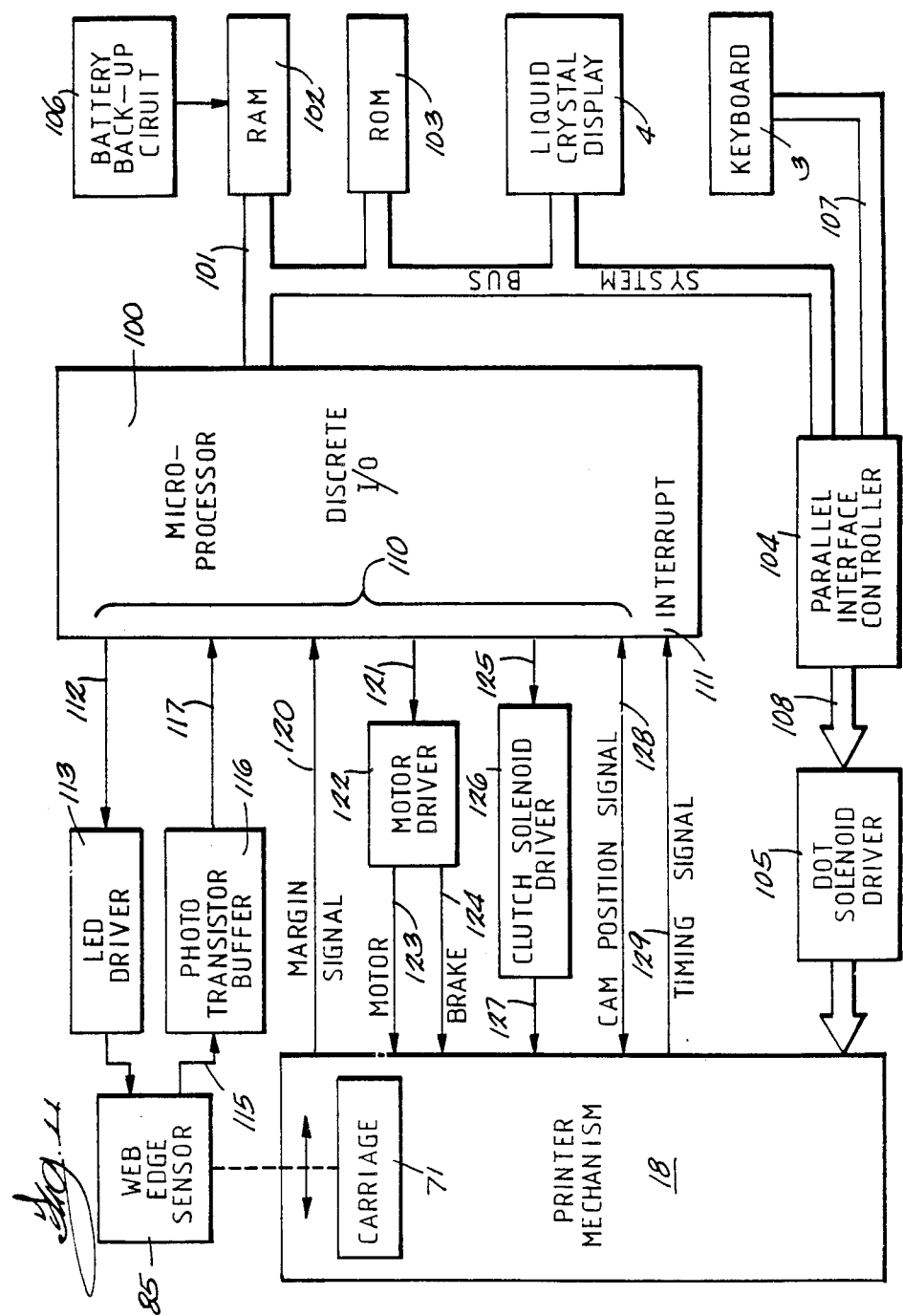

ELECTRONIC LABELER WITH PRINTHEAD AND WEB SENSOR COMBINED FOR CONCURRENT TRAVEL, AND ASSEMBLIES OF IDENTIFICATION DEVICES THEREFOR

TECHNICAL FIELD

This invention relates to the art of microprocessor controlled apparatus for printing indicia on identification devices such as labels, wire markers, marker sleeves and the like.

BACKGROUND

There are a number of U.S. patents that disclose electronic apparatus for printing indicia on labels, some of which are restricted to hand held units and others that disclose tabletop units. The patents known to the applicants at the time of filing this application for patent are as follows. There are a large number of patents assigned to Monarch Marking Systems, Inc., all of which are restricted to hand held labeling machines: U.S. Pat. Nos. 4,264,396, Stewart; 4,407,692*, Torbeck; 4,473,426*, Goodwin et al.; 4,477,305*, Hamisch, et al; 4,479,843*, Newhard et al.; 4,488,671*, Hamisch; 4,490,206*, Makley; 4,497,682*, Hamisch; 4,498,947*, Hamisch et al; 4,511,422*, Hamisch et al.; 4,544,434*, Mistyurik; 4,556,442*, Torbeck; 4,561,926*, Hamisch et al.; 4,584,047*, Vanderpool et al.; 4,584,048*, Hamisch et al.; and 4,680,078, Vanderpool et al. Tabletop units for this general purpose, some of which are portable, are described in U.S. Pat. Nos. 4,440,248, Teraoka; 4,501,224, Shibayama; 4,630,538, Cushing; and 4,655,129, Wirth et al., assigned to the assignee of this application for patent, which relates to a marker sleeve printing apparatus developed for use with a communication terminal such as a computer. Equipment of this type that is or has been sold commercially for printing labels is represented by Monarch's Pathfinder labeler, the E-Z-Coder ® printer sold by Thomas & Betts Corporation, and the Bradywriter ® and Bradywriter II ® industrial printers sold by the assignee of this application for patent.

The electronic machines for printing labels of this type all include the same general combination of elements, a printhead, means for feeding a web of stock to be printed past the printhead, a microprocessor, a read only memory programmed with appropriate instructions, a random access memory, a keyboard with letter, number and function keys for the entry of alphanumeric information and instructions concerning the indicia to be printed, and a visual display such as an LED or LCD unit to assist the operator in using the machine. This type of equipment is preferred by many users concerned with marking electrical wires, electrical devices such as EPROM's, IC's and other components, and various types of articles with specific identifying indicia such as a serial number or code because it allow the user to generate the required printed markers at or near the job site as needed instead of utilizing preprinted marker devices.

The present invention is concerned with a machine of this general type that includes a novel arrangement of printhead and web sensor elements to facilitate accurate registration of a marker device and the printing to be applied thereto. One of the systems for accomplishing this function as shown in the prior art represented by the above patents and commercial devices involves a tractor feed system in which the machine has a feed wheel with teeth or a sprocket that engages holes, cuts or other apertures formed in the web of labels that is to be printed. This type of system for obtaining registration between labels and a printhead is disclosed in the nine patents listed above that are marked with an asterisk and employed in the Bradywriter and Bradywriter II machines. U.S. Pat. No. 4,680,078 describes what appears to be a variation of the tractor feed that utilizes a slotted timing disk and a mating web feed roller. The disk is coded with small slots for each dot line of print and large slots for the beginning of the label. The timing disk senses the position of the web feed roller, not the web to be printed, and it appears that the feed roller must be of the type that engages apertures or other cuts in the web such as with a tractor transport in order for the device to operate properly.

Other of the listed prior art discloses the use of photoelectric sensors in this type of equipment. Thus, the electronic labeler of U.S. Pat. No. 4,264,396 includes an optical sensor spaced from and located upstream of the printhead; the sensor is to detect an ink strip or other mark printed on the web and registered with each individual label. U.S. Pat. No. 4,440,248 discloses a bar code printing apparatus that aso includes a photoelectric sensor spaced from and upstream of a printhead that is said to function as a label detector to control web advancement, but details of its operation are not disclosed in the patent. The system of U.S. Pat. No. 4,501,224 has a photosensor spaced from and upstream of a printhead that detects an aperture formed in the web of stock being printed and generates an output signal that is used for timing of the printing and cutting operations. The optical sensing systems disclosed in these latter patents have two features in common: the optical sensor is a stationary element and the sensor is spaced from or separate from the printhead element of the machine.

SUMMARY OF THE INVENTION

The present invention provides a microprocessor controlled electronic apparatus for printing indicia on identification devices including means for feeding an assembly including a plurality of identification devices past a printing position, a printhead arranged for transverse movement back and forth across the width of the assembly, and a web edge sensor for travel concurrently with the printhead. This feature in a device of the present invention provides for accurate positioning of individual identification devices of the assembly to thereby enable indicia to be suitably printed thereon; the provision of an apparatus with this capability is a main object of this invention. Furthermore, another advantage of the foregoing arrangement of printhead and web edge sensor is that an electronic apparatus for printing identification devices is provided that is capable of printing on several different widths of assemblies, i.e. resulting in the ability to print on different sizes of identification devices. Another main object of this invention was to provide this functionality in a microprocessor controlled apparatus for printing identification devices. Still another advantage of this construction is that it enables accurate positioning of printing on individual identification devices even though utilizing a feed mechanism for the assembly of the feed roller type which is subject to inherent inaccuracies in advancement of the assembly through the apparatus; this eliminates the need to employ a tractor feed system, which is another objective of this invention. In another aspect, the present invention provides assemblies of identification devices such as labels, wire markers, marker sleeves, etc., that are of a particular configuration especially adapted for use in an apparatus of the foregoing type. This feature is provided in assemblies of identification devices that have a first preselected width and means defining a second preselected width that is less than the first preselected width, thereby providing two different widths for detection by the web edge sensor associated with the printhead. Another feature of the assemblies of identification devices of the present invention is means defining an end of the assembly that is detectable by the web edge sensor to thereupon terminate printing operations. Another principal object of this invention was to provide assemblies of identification devices having these structural features. A still further main object of the invention was to develop microprocessor controlled electronic apparatus for printing identification devices that can utilize off-the-shelf mechanisms to thereby reduce its costs and enhance its utility.

DESCRIPTION OF THE DRAWINGS

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention. In the drawings:

FIG. 2 is a side view, with portions broken away, of the machine of FIG. 1;

FIG. 5 is a perspective view of a portion of the printer mechanism of FIG. 3;

FIG. 6 is a top view of an assembly of identification labels of a type useful with the machine of FIG. 1;

FIG. 7 is a top view of a second assembly of sleeve marker identification devices of a type useful with the machine of FIG. 1;

FIG. 8 is a top view of a third assembly of label identification devices of a type suitable for use with the machine of FIG. 1;

FIG. 9 is a view of the assembly of FIG. 6 in roll form;

FIG. 11 is an electrical schematic diagram of the machine of FIG. 1;

DESCRIPTION OF PREFERRED EMBODIMENTS

The following describes a presently-developed embodiment of a machine according to the present invention that is particularly adapted to print legends on identifying devices, such as wire markers, labels, marker sleeves, etc. Parts (a) and (b) are a general description of the illustrative machine, part (c) is a detailed description of the novel printhead and sensor assembly of the present invention, part (d) describes novel identification devices suitable for use with the machine, and parts (e)-(g) provide detailed description of the electronics of the machine and its operation.

Figure 1:
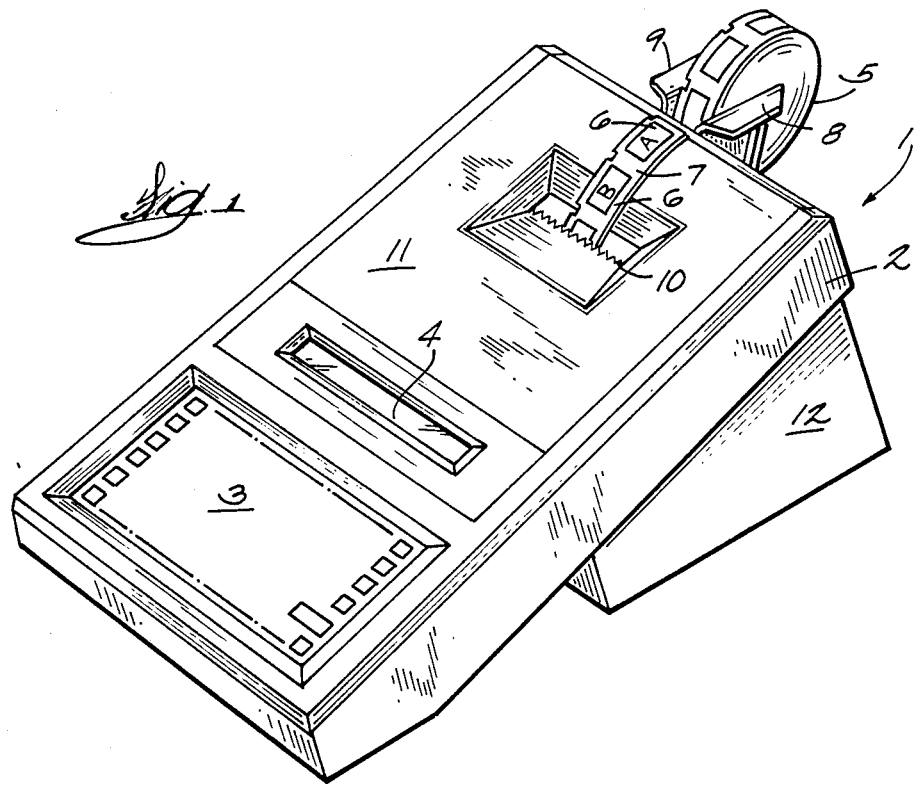
FIG. 1 is a perspective view of a machine for applying legends to identification devices constructed in accordance with the present invention.

(a) General Machine Description, FIGS. 1 and 2

FIG. 1 illustrates a machine 1 of the present invention comprising a wedge-shaped housing 2, such as of molded plastic, that supports the several elements of the machine. A keyboard 3 is at the front of the machine 1 and a liquid crystal display 4 is positioned just above the keyboard, both of these elements being secured to appropriate supporting structure within the housing. An assembly 5 of identification devices, shown in FIG. 1 as a series of adhesive labels 6 supported on a carrier web 7, in the form of a roll is supported between brackets 8 and 9 at the rear of the machine. Brackets 8 and 9 are attached to housing 2 so to be adjustable (see FIG. 2) so that the machine 1 can accommodate assemblies of identification devices of various selected widths. The end of the carrier web 7 is led between the feed rollers of a printer mechanism (described in part (b) below) and exits through a slot 10 defined in a cover 11 arranged over a printer compartment of the housing. The cover 11 can be detached from the housing to allow access to the printer mechanism.

The exemplary machine 1 is illustrated in the form of a portable tabletop apparatus, and the housing 2 includes an integral rear base portion 12 that is designed to present the top surface of the machine at an angle to the user to facilitate comfortable operation of the machine. It is pointed out, however, that a machine according to the present invention can be made in the form of a handheld unit as well as a tabletop unit such as described herein.

The sectional view of FIG. 2 shows further details of the machine 1. A printed circuit board (PCB) 15 is supported inside the housing 2 along the front portion thereof underneath the keyboard 3 and display 4. PCB 15 supports most of the electronic components of the machine and is described below in greater detail. A front bottom cover 16 is attached to the housing to close off part of the bottom of the housing. The rear section of housing 2 defines a printer compartment 17 in which a printing mechanism 18 is supported. The printing mechanism 18 is illustrated in dashed line in FIG. 2 and will be described in further detail below. Rear bottom cover 20 encloses the bottom of rear base portion 12 of the housing and supports a set of rechargeable batteries 21 that are held in place on the rear bottom cover by means of battery clamp 22. The batteries are connected to PCB 15 through appropriate wiring illustrated schematically by wiring 23. An external transformer, not shown, can be plugged into an AC power source and connected to plug 24 retained in the rear wall of the housing to recharge the batteries 21 in the usual manner, and the machine 1 can be operated from either battery power or AC power as desired by the user. An on-off switch, not shown, is located on the left side of machine 1.

Figure 3:
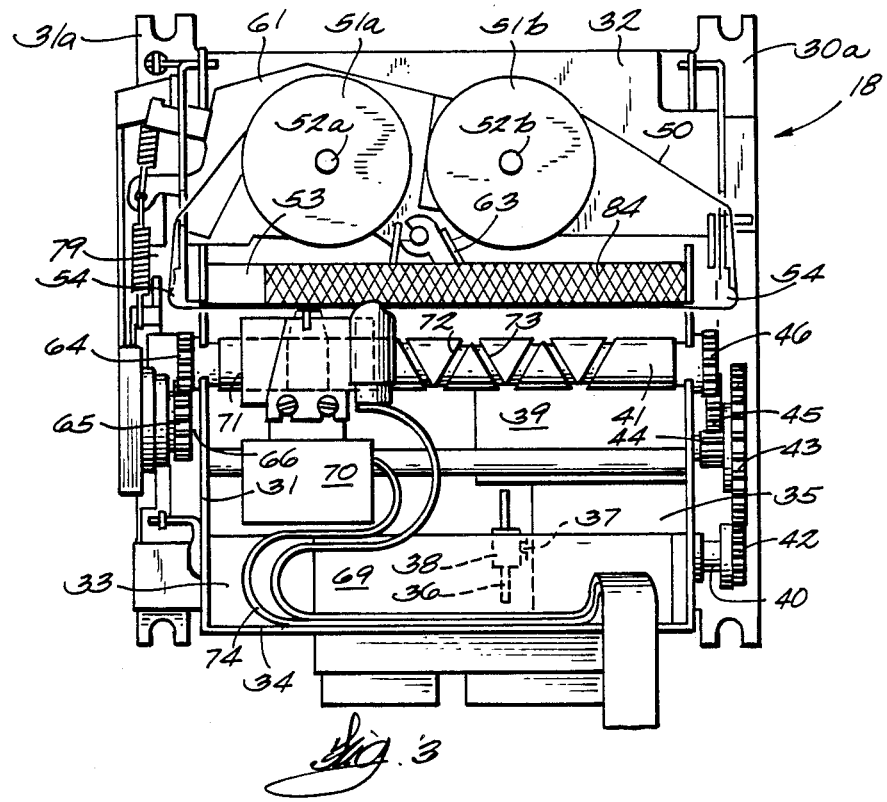
FIG. 3 is a top view of a printer apparatus incorporated in the machine of FIG. 1.
Figure 4:
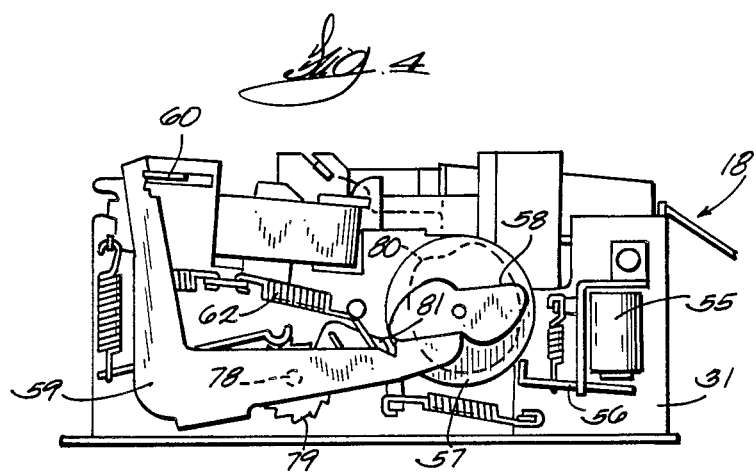
FIG. 4 is a left-hand side view of the printer mechanism of FIG. 3.

(b) General Description of Printer Mechanism. FIG. 3 and 4

An advantage of a machine of the present invention is that commercially available printer mechanisms can be incorporated in the machine without special modifications except as described in part (c) below. The specific printing mechanism 18 illustrated with machine 1 is a model DP834-12 dot matrix printer mechanism available from Star Micronics Inc. A general description of the printing mechanism is presented in this part in order to fully understand the operation of a machine of the present invention, although the specific printer structure now described is not a part of the present invention. A more detailed description of the structure and operation of the printing mechanism 18 will be found in Star Micronics' Technical Manual for the DP834-12 and its Specification and Operation Manual, both of which are incorporated herein by reference.

(i) Drive System.

Referring first to FIG. 3, the printer mechanism 18 includes spaced side plates 30 and 31 connected by end plates 32, 33 and 34 that form a frame to support its various elements. A motor 35 is attached to the frame and carries a slotted timing disk 36 on a shaft 37 extending from one end of the motor. The timing disk is rotated through a photosensor 38 also supported at an end of the motor 35. (See also FIG. 5). Slotted disk 36 and photo sensor 38, together with a waveform shaping circuit, not shown, form a timing detector that generates timing signal pulses which are employed to control printer operation. An electronic governor 39 controls the speed of motor 35 so that characters will be printed at constant speed regardless of torque load, source voltage and ambient temperature. A motor output shaft 40 extends from an opposite end of motor 35 and is connected through a reduction gear train to drive shaft 41 rotatably supported between plates 30 and 31. The reduction gear train includes a motor pinion 42 supported on shaft 40 and meshed with primary gear 43 that includes an integral pinion 44 which is meshed with secondary gear 45 that is meshed with drive shaft gear 46. The gear train is also illustrated in FIG. 5.

(ii) Ribbon Feed.

An inked ribbon 50 is carried in a pair of spools 51 supported on spool shafts 52 extending from end plate 32 The inked ribbon 50 extends from one spool 51a, across platen 53 to the other spool 51b, the ribbon passing through appropriate slots in the side plates 30 and 31 and across ribbon guides 54 secured thereto. The side view of FIG. 4 best illustrates the ribbon feed mechanism. When clutch solenoid 55 is energized, clutch trigger 56 is disengaged from a control cam 57. Rotation of control cam 57 results in rotation of ribbon feed cam 58 formed as an integral element on the outer surface of cam 57 to thereby actuate cam lever 59. Movement of cam lever 59 is transferred to ribbon feed lever 60 that includes ribbon feed pawl 61 (FIG. 3) that engages a ratchet, not shown, secured to spool shaft 52a. Return movement of cam lever 59 is effectuated by cam lever spring 62. This feed mechanism provides for incremental movement of the ribbon 50, and a detection lever 63 rotates in accordance with the diameter of the ribbon on spool 51b so that when the ribbon feed pawl 61 engages along the bottom of the ribbon detection lever 63 and the pawl is thereby engaged with another ratchet, not shown, attached to spool shaft 52b. For operation of the ribbon feed, the control cam 57 is rotated by pinion 64 on the end of drive shaft 41 that meshes with gear 65 pinned to shaft 66 on which the control cam is supported, and gear 65 drives the control cam through a clutch, not shown.

(iii) Printhead.

The printer mechanism 18, returning now to FIG. 3, includes a printhead 70 supported on a carriage 71 that is driven right and left transversely across the assembly 5 of identification devices by drive shaft 41. As shown in FIG. 3, drive shaft 41 includes double helical grooves 72 and 73 and forms a cylindrical cam for transporting the carriage 71. The printhead 70 in the exemplary embodiment is a dot matrix printer consisting of nine needle wires and nine solenoids. When a solenoid is energized, a needle wire is driven towards the platen 53 to print a single dot on an identification device present between the inked ribbon 50 and the platen 53 upon appropriate instruction by the program described in detail below. When a print solenoid is deenergized, a needle wire is returned to its original position. A cable 74 connects the printhead 70 to a terminal PC board 69 mounted on end plate 33.

(iv) Web Feed.

Referring first to FIG. 2, the assembly 5 of identification devices is led around a chute 75 of the printer mechanism 18 and between a feed roller 76 and idler roller 77 supported from the chute 75, following which the assembly 5 is led between inked ribbon 50 and platen 53 to thereafter exit through slot 10 of cover 11. The feed roller 76, returning now to FIG. 4, is carried on a shaft 78 rotatably supported between side plates 30 and 31, and the shaft carries a feed ratchet 79 on an end outside of side plate 31. When clutch solenoid 55 is energized and clutch trigger 56 disengaged from control cam 57, the control cam starts to rotate. The inner surface of control cam 57 includes an integral single lobe web feed cam 80 which operates web feed lever 81 that engages the teeth of feed ratchet 79. When lever 81 is operated, the feed ratchet is moved one tooth position to thereby rotate feed roller 76 and advance the assembly 5 a selected distance; in the illustrative embodiment, the assembly 5 is fed ⅛th of an inch upon each incremental rotation of feed roller. The web feed system also includes a detector for ascertaining the position of the web feed cam comprising a permanent magnet mounted on web feed lever 81 and a Hall effect IC, both not shown, to enable accurate detection of the web feed cam.

The printer mechanism 18 as described in this part (b) is an example of a specific type of printer mechanism that can be employed with a machine of the present invention. The structural details of the printer 18 as described so far do not form a part of the present invention except that the printer mechanism as defined in the claims is to include a printhead 70 that is transported transversely back and forth across the assembly of identification devices that are to be printed. Any form of printhead 70 other than the dot matrix printer described above can be used in the machine, as long as it has this transverse movement feature. However, the arrangement of printhead 70 and web edge sensor 85 as described next in part (c) is a novel feature of a machine of this invention.

(c) Web Edge Sensor, FIG. 5

Turning now to FIG. 5, a feature of a machine of this invention is a web edge detector 85 mounted directly on the printhead 70 so that the sensor will be transported back and forth transversely of assembly 5 concurrently with transport of the printhead 70 back and forth across the web 7. The sensor 85 is attached to the printhead 70 by means of a bracket 86 that includes a flat panel 87 attached to the printhead 70 and a cylindrical element 88 in which the sensor 85 is supported.

In the specific illustrative embodiment of the machine 1, the web edge sensor 85 is a Hewlett Packard HBCS-1100 high resolution optical reflective sensor. The sensor system includes a source of optical flux, transmission path and a receiving detector. Specifically, the sensor element 85 includes an LED photo emitter that directs light through a lens towards the platen 53 of the printer mechanism, a phototransistor detector and a signal amplifier that interfaces with an appropriate logic circuit. This provides a sensor that converts physical parameters into electrical signals that can be directly interfaced to a digital system. Full details of the structure and operation of the HBCS-1100 sensor are set forth in Hewlett Packard Application Note 1008 entitled Optical Sensing for the HEDS-1000, which is incorporated herein by reference. Briefly, the sensor measures the ratio between the optical flux directed through the lens of the device towards the platen 53 and the incident flux reflected from the platen 53 or a web 7 as detected by the receiving detector of the unit.

Thus, the web edge sensor 85 when mounted to the printhead 70 scans horizontally with each pass of the printhead 70. The retro-reflective optical sensor is to be positioned to focus on the surface of the assembly 5. The surface of the platen 53 facing the sensor is covered with a dark non-reflective surface to prevent or greatly reduce reflection of light when the printhead is outside the edge boundaries of the assembly 5; this is indicated by panel 84 in FIG. 5 which may comprise a non-reflective coating or black film adhered to the platen 53. The sensor 85 is connected through cable 89 to appropriate circuitry carried on PC board 15 as discussed in greater detail below.

The feature of mounting a web edge sensor 85 directly on a transversely moving printhead provides accurate registration of an individual identification device with the printhead so that the user-selected indicia to be printed can be accurately positioned on an individual identification device.

(d) Identification Device Assemblies, FIGS. 6–9

Three specific forms of new identification device assemblies are illustrated in these drawings that have been particularly developed for use with machine 1.

FIG. 6 is a detailed view of the assembly 5 of identification devices previously illustrated. Individual die-cut labels 6 are spaced from one another along a carrier web 7. Each label 6 includes a layer of pressure sensitive adhesive on its lower surface that is releasably adhered to the carrier web 7. A notch 90 is die cut along an edge of carrier web 7, there being one notch 90 positioned at a preselected distance from an end of a label 6. Also, the exposed outer surface of each label 6 is to be printable, and an appropriate printable coating may be applied to the material of each label if it is not suitably receptive to printing ink.

FIG. 7 illustrates an assembly 91 of marker sleeves suitable for use with a machine 1. The assembly 91 is formed of a base web 92 and a top web 93 that are seamed together along transverse seams 94 to form individual tubular marker sleeves 95, each separable from the assembly along a perforated line formed in each seam 94. The base web 92 is wider than top web 93, and notches 90 are defined along a marginal portion of base web 92. There is one notch 90 located at a preselected position relative to each marker sleeve 95. Each marker sleeve 95 is to have a printable surface.

FIG. 8 illustrates an assembly 96 of marker labels 97 each consisting of a printable first portion 98 and transparent second portion 98a. The labels 96 each have a layer of adhesive on their bottom surface and each label is releasably adhered to a carrier web 7 along the layer of pressure sensitive adhesive. Notches 90 are defined along an edge of the carrier web 7, there being one notch 90 located a preselected distance from an end of a label 96. After indicia are printed on printable first portion 98 of a label 97, the transparent second portion 99 can be wrapped around and laminated over printed first portion 98 along the adhesive layer so as to cover and protect the printed indicia; identification devices such as labels 96 can be used, for example, to identify tubular shaped articles such as wires and other products.

As illustrated in FIGS. 6, 7 and 8, the assemblies 5, 91 and 96 each include a non-reflective end of roll marker 99. A marker 99 covers a notch 90 in each assembly and extends across the width of an assembly from one longitudinal side edge to the other. The height of a marker 99 in the longitudinal direction of an assembly should be at least equal to that of a notch 90. Further, the leading edge of a marker 99 is spaced a distance X from the end of an assembly that is greater than the distance between the feed means of an apparatus and the web edge sensor. With specific reference to machine 1, the distance X in the illustrated assemblies is equal to ⅛ inch (the line feed) plus the distance between the nip of feed roller 76 and idler roller 77 and the center line of web edge sensor 85. A marker 99 can comprise a black or otherwise dark colored nonreflective coating applied to an assembly such as by printing or, in the illustrative embodiments, a strip of black or other dark colored pressure sensitive adhesive tape applied at the specified position. The purpose of an end of roll marker 99 is described in detail below in part (g) of this description.

Assemblies of identification devices suitable for use with the apparatus 1 are supplied to the user as an assembly including a plurality of individual identification devices arranged end-to-end in the form of a web and wound into roll form. This is illustrated in FIG. 9 shown schematically as assembly 5 wound onto a core 82.

Assemblies of identification devices such as assemblies 5, 91, and 96 can be of any material appropriate for use as labels or marker sleeves, such as paper, plastic film or synthetic nonwoven web. Various plastic films can be used, including, for example, polyolefin films such as polyethylene and polypropylene, polyester films, vinyl films, fluorocarbon films, etc. Most plastic films will require a printable coating so as to receive and retain the indicia applied by the printhead of the apparatus 1; many types of printable coatings are known in the art, and usually include an absorbent filler such as silica or calcium carbonate dispersed in a polymeric binder such as a polyester or vinyl polymer. Labels 6 of assembly 5 and labels 97 of assembly 96 each include a layer of pressure sensitive adhesive along their bottom surface. Many types of suitable pressure sensitive adhesives are known in the art, and typically comprise a synthetic or natural rubber, or a synthetic polymer or copolymer, compounded with compatible resin tackifiers such as terpene resins, ester gum, and the like, and dispersed in an organic solvent or water. The labels 6 and 97 are also to be "releasably adhered" to a carrier web 7, which means that the labels can be readily removed from the carrier web without the pressure sensitive adhesive delaminating from the labels and transferring to the carrier web. If a carrier web is not of a material that is inherently releasable with respect to the pressure sensitive adhesive, the carrier web can be coated or impregnated with a suitable release material; silicone coatings, carbamate coatings, and other types of other release coatings are well known in the art. Carrier webs, labels and webs for the sleeve markers of assembly 91 will be thin flexible materials usually in the range of about 0.001 inch to 0.020 inch (about 0.025 to 0.25 mm) thick being preferable as suitable for most uses and for reasons of economy.

Figure 10:
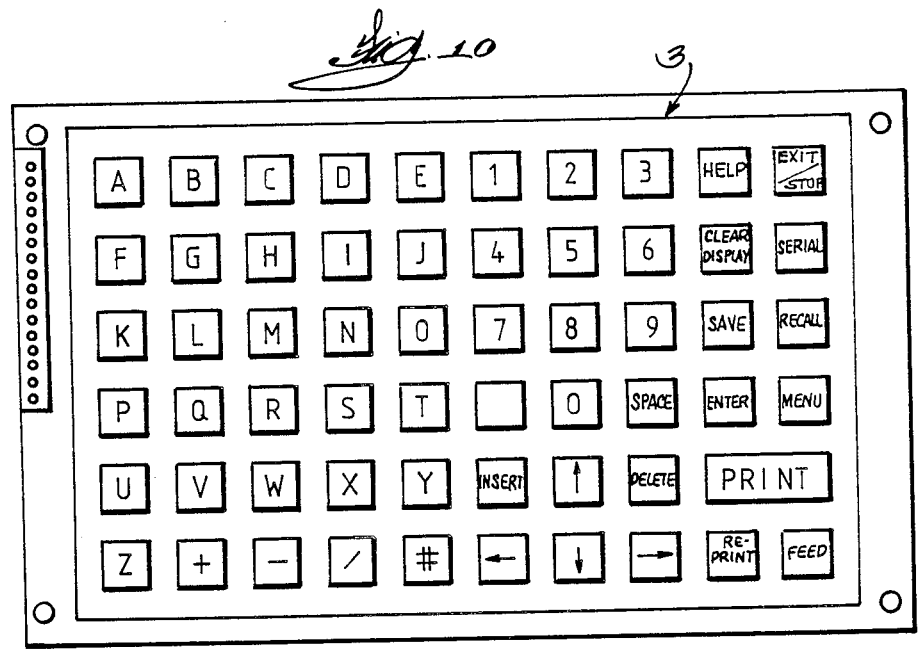
FIG. 10 is a plan view showing details of the keyboard element of the machine of FIG. 1.

(e) Keyboard and Machine Functions, FIG. 10

Referring to FIG. 10, the keyboard 3 includes keys representing the letters of the alphabet A-Z, the numerals 0-9, a set of special symbols ("<space>", "<period>", "+", "−", and "#"), and a set of function keys. Using these keys, an operator can program the content of the legends to be printed on the identification devices in a manner similar to that used in prior machines of this kind. The programming operation is performed on a menu driven basis, also well known in the art. The operator is provided instructions in the form of menus, or prompts, on the display 4 and responds by pressing the appropriate key(s) to choose a menu selection. The general capabilities afforded by the machine 1 are as follows.

There are two basic modes in which identification devices may be printed, Single Label Mode and Batch Mode. As the names imply, the Single Label Mode prints a single legend, while the Batch Mode may print a group of predefined legends. In the Batch Mode, each "group" of legends is referred to as a "LIST". Up to 26 LISTs of legends may be defined, each LIST consisting of one or more legends. The only limit on the length of a LIST is that the combined length of all 26 LISTs is limited to the memory space available, 6656 characters in this exemplary embodiment.

In either the Single Label or Batch modes, two additional options are available, serialization and multiple copies. Serialization means to produce a sequence of identifying devices, as in serial numbers, etc., in which one or more fields of the legend, e.g. characters or numerals, is incremented on successive devices. The other option, multiple copies, allows the print cycle to be repeated a specified number of times. Both of these features have been known and used in prior devices.

A brief description of the operation of the function keys can now be given.

(i) EDITING KEYS.

An INSERT key is included to change the editing mode between an insertion mode, where entered characters are inserted at a cursor position, and a replacement mode, where entered characters replace the character at the cursor position. A DELETE key allows characters at the cursor position to be deleted. A set of cursor movement keys (<up arrow> ↑, <down arrow> ↓, <left arrow> ←, and <right arrow> →) allow the cursor to be positioned within the display 4. These cursor movement keys are used for editing the text in legends and for making menu selections.

(ii) PRINTING CONTROL KEYS.

A PRINT key causes the machine 1 to begin printing in the selected mode, e.g. Single or Batch. An EXIT/STOP Key causes the printing to be terminated, while a REPRINT key causes the PRINT sequence just previously executed to be repeated. A FEED key causes the feed mechanism to advance the web either after printing or when loading a new web into the machine 1.

While a feed function has generally been known and used in prior machines, the feed function employed in the machine 1 described herein is an important aspect of this invention. The feeding operation of this invention is described in detail below, but basically provides the capability to both check the size of an assembly of identification devices installed in the machine 1 and to accurately register each identification device 6, 95 or 97 into a position to be printed.

(iii). MENU SELECTION KEYS.

A MENU key is provided which, when pressed, causes the Main Menu to be entered on the display. The cursor can then be moved to the desired menu selection with the cursor movement keys described above. Alternatively, the first letter of the desired menu item can be entered using the alphabetic keys. In either event, pressing an ENTER key then causes the selected menu item to be invoked, for example, a command to change mode (Single vs. Batch).

(iv). LIST MODIFICATION KEYS.

In the Batch mode, new LISTs are created by entering a legend and then pressing the SAVE key to add the legend to the LIST. A RECALL key is provided to select a previously entered LIST for printing or editing.

(v) SERIALIZATION.

A SERIAL key, when pressed, causes a normal character or numeral at the current cursor position to become a "serialized" field, as described above. If the character or numeral at the current cursor position is already "serialized", then pressing the SERIAL key causes it to toggle back to a normal (e.g. non-serialized) field.

(vi) MISCELLANEOUS.

A CLEAR DISPLAY key is provided as a convenient means of deleting an entire legend in the display 4. A HELP key causes a message to be displayed on the display 4 directing the operator to the appropriate documentation for the current mode of operation.

(f) Electrical Hardware Description, FIG. 11

Referring now to FIG. 11, the operation of the machine 1 is based on a microprocessor 100. The particular microprocessor now preferred is a type 80C31 manufactured by Intel Corp. The microprocessor interfaces through a system bus 101 to a random access memory (RAM) 102, a read only memory (ROM) 103, the display 4, and a parallel interface controller 104. The microprocessor 100 and the peripheral circuits listed above are all of the Complementary/Symmetry Metal Oxide Semiconductor (CMOS) variety in order to minimize power drain on the batteries 21.

The RAM 102 is an 8K by 8 bit CMOS device available from multiple sources, and is powered through a battery back up circuit 106 to maintain a minimum voltage required for retention of data. The battery back-up circuit 106 normally channels power from either the batteries 21 or an external AC source (not shown) to the RAM 102, but also contains a high energy lithium cell (not shown) for keeping a minimum memory retention voltage on the RAM 102 if the batteries 21 are exhausted and an AC source is not connected. The RAM 102 is therefore essentially non-volatile, so that legends, LISTs of legends, and other control variables stored therein are retained indefinitely.

The ROM 103 is a 32K by 8 bit CMOS device available from multiple sources, and is used to store the operating programs for the microprocessor 100. Many of the functions performed by these programs are to implement the features common to prior label printing systems as described briefly above. As these features are well known by those skilled in the art, a detailed description of the programs implementing them is not provided herein. However, certain new operating programs are used to implement this invention, and the function of these programs is described in detail below.

The display 4 is a type HD44780 manufactured Hitachi Co., and includes an integral controller (not shown) for accepting characters and command information from the system bus 101 in well known fashion. The display medium is of the liquid crystal type, again to minimize battery drain, and contains an area of two character lines by twenty characters per line.

The parallel interface controller 104 is a type 82C55 manufactured by Intel Corp., and provides three banks of Input/Output (I/O) lines with eight I/O lines per bank. The parallel interface controller interfaces to the system bus 101 in well known fashion to allow the microprocessor 100 to configure and address all I/O lines.

Two banks of I/O lines 107 connect to the keyboard 3. The keyboard 3 is composed of a standard switch matrix which is scanned using the I/O lines 107 in well known fashion.

The third bank of I/O lines 108 from the parallel interface controller 104 is connected to a set of dot solenoid drivers 105. The dot solenoid drivers 105 are individual transistor amplifiers for providing drive currents to the individual dot solenoids in the printhead 70 of the printer mechanism 18. Printing may thereby be performed by instantaneously energizing the dot solenoids in an appropriate sequence as the printhead 70 scans across the assembly of markers 5. This printing process is well known in the art.

The microprocessor 100 also interfaces to the printer mechanism 18 via a set of discrete I/O lines 110 and an interrupt input 111. As described above, the web edge sensor 85 is mounted on the carriage 71 and moves horizontally therewith across the platen 53.

The web edge sensor 85 contains an LED emitter and a photo-transistor detector to detect the amount of light reflected from the surface directly in front of the sensor 85. One output line 112 of discrete I/O 110 is applied through an LED driver circuit 113 to supply power to the LED emitter. To conserve battery power, the LED emitter may be energized only when needed.

The photo-transistor produces an output signal 115 which is applied through a buffer amplifier 116 to an input line 117 of discrete I/O 110. The microprocessor 100 can thereby determine the presence of the web 7 by reading the photo-transistor output 117.

The use of a moving web edge sensor 85 is an important aspect of this invention. As will be described in detail below, the microprocessor 100 maintains the current position of the carriage 71 as it moves horizontally across the platen 53. By sensing the photo-transistor output 117, the microprocessor 100 is able to determine the points during the horizontal travel where an assembly 5,91 or 96 begins and ends, e.g. measure the width of an assembly across the horizontal line just scanned.

The measurement of the width of the assembly provides two important pieces of information. First, the machine 1 is capable of printing on assemblies of various widths. The width of the assembly that is supposed to be loaded is based upon information entered by the operator through the keyboard 3. This operation is referred to herein as "configuring" the machine 1 for the width specified by the operator entry.

The configured width is used by the microprocessor 100 to determine the maximum number of characters per line in the legend and the position of the legend, for centering purposes, on the identification device to be printed. If the width of the assembly actually loaded, as measured by the moving web edge sensor 85, is different than the width configured by the operator, an error is generated and printing is terminated. This prevents waste that may otherwise occur by inadvertently printing on the wrong size identification devices.

Second, the width measurement is used to register an assembly of identification devices vertically so that printing always begins at the top of an identification device 6, 95 or 97. This is accomplished by allowing the assembly to advance vertically as long as the measurement of the horizontal width is within a predetermined tolerance range of the nominal web width configured by the operator. The reduced horizontal width at a notch 90 is then detected and vertical advancement terminated.

Still referring to FIG. 11, a reed switch (not shown) is mounted on the printer mechanism 18 near the extreme left margin of travel of the carriage 71. The carriage 71 includes a magnet (not shown) mounted such that when the carriage is at the extreme left margin of travel, the reed switch closes to indicate that the carriage is indeed at the left margin. The output of the reed switch is connected as a MARGIN signal to an input line 120 of discrete I/O 110. The microprocessor 100 can thereby determine the precise position of the carriage 71 by detecting a change in the MARGIN signal 120.

Output line 121 from discrete I/O 110 connects to a motor driver circuit 122. The motor driver circuit 122 converts the ON/OFF state represented on line 121 into two separate drive signals, MOTOR 123 and BRAKE 124. MOTOR signal 123 supplies power to the motor 35, and is activated when line 121 is "ON". When line 121 is "OFF", MOTOR signal 123 is deactivated and BRAKE signal 124 is activated. The BRAKE signal 124, when activated, places a short circuit across the input of the motor 35, causing the motor 35, and the carriage 71 driven thereby, to stop quickly instead of continuing to glide past the desired stopping point.

Output line 125 from discrete I/O 110 connects to a clutch solenoid driver circuit 126. The output 127 of clutch solenoid driver circuit 126 supplies current, when activated, to energize the clutch solenoid 55. As described above, a sensor (not shown) detects the position of the web feed cam and produces a CAM POSITION signal 128. The CAM POSITION signal 128 is connected as an input to discrete I/O 110 and indicates if the single lobed web feed cam 80 is in a position to cause web feed when the clutch solenoid 55 is next engaged.

Detector 38 positioned over the slotted timing disk 36 on the motor 35 produces a string of periodic timing pulses whenever the motor 35 is running. The output of the sensor 38 is connected as a TIMING signal 129 to the interrupt input 11 of microprocessor 100.

Since the carriage 71 is mechanically linked to the motor 35, the TIMING signal 129 is also related to the relative position of the carriage 71. In other words, each pulse on the TIMING signal 129 corresponds to a certain amount of movement of the carriage along the helices 72 and 73.

The basic mechanism for tracking the position of the carriage 71 is as follows. The MARGIN signal 120 serves as a reference indicating that the carriage is at the left margin. When the carriage 71 encounters the left margin, e.g. the MARGIN signal 120 first becomes true, a predetermined number of pulses on the TIMING signal 129 will be generated as the carriage 71 moves out to the right margin in a forward direction and back to the left margin again in a reverse direction.

While traveling in either the forward or reverse direction, the position of the carriage 71 is maintained in the software, described below, by counting the number of pulses which occur on the TIMING signal 129. The result is a HEAD POSITION count which is the basic measure of head position. The HEAD POSITION count is initialized to a value of "1" each time the MARGIN signal 120 is activated. The HEAD POSITION count is then incremented for each pulse of the TIMING signal 129 in both the forward and reverse directions.

The HEAD POSITION count therefore indicates the position of the carriage 71 throughout a forward/reverse cycle, with lower numbers corresponding to positions during forward motion, mid-range numbers corresponding to the turning point at the right margin, and higher numbers corresponding to positions during reverse motion.

In the linear range of the helices 72 and 73, each increment of the HEAD POSITION count is equal to a fixed increment of distance determined by the number of slots on the timing disk 36, the ratios of the gearing used, and the pitch of the helices 72 and 73. In this exemplary embodiment, each increment of the HEAD POSITION count corresponds to 0.0035 inches of travel of carriage 71.

(g) Software Description, FIGS. 12-19

The following description pertains to those portions of the software which implement the functions unique to this invention. Software which implements functions known and used in prior machines is understood to be included in the machine 1, although not described herein.

The following description refers specifically to assembly 5 comprising adhesive labels 6 on carrier web 7, as previously described, for clarity of description. It will be understood, however, that the same procedures are employed with assemblies 91 and 96 described above.

One important function of the software peculiar to this invention is to advance the web 7 to a position where one of the labels 6 is in registration for printing. That function is referred to herein as "indexing", and can be performed in two different ways.

First, indexing can be performed upon completion of printing the text lines on a label 6. In that case, the indexing operation advances the web 7 from wherever the printing of the prior label left off to the beginning, or registration point, of the next label. If another label is to be printed immediately after printing the prior label, the printing can commence without delay, as the indexing operation insures that the next label is properly aligned and registered for printing.

The second type of indexing can then be used to verify that the web 7 is still correctly positioned for printing. This function is useful, for example, when the machine 1 stops after printing one or more labels 6. In that case, the web 7 is left at the registration point by the first type of indexing operation described above after the last label was printed. However, the web 7 may be moved out of alignment while the machine 1 is stopped, for example, by the operator manipulating the web 7 to remove the label 6.

The second type of indexing can then be used to verify correct positioning of the web 7. If the positioning is correct, the web 7 is not advanced. Otherwise, the web 7 is advanced as in the first type of indexing operation to position the next label 6 at a registration point for printing.

Figure 12:
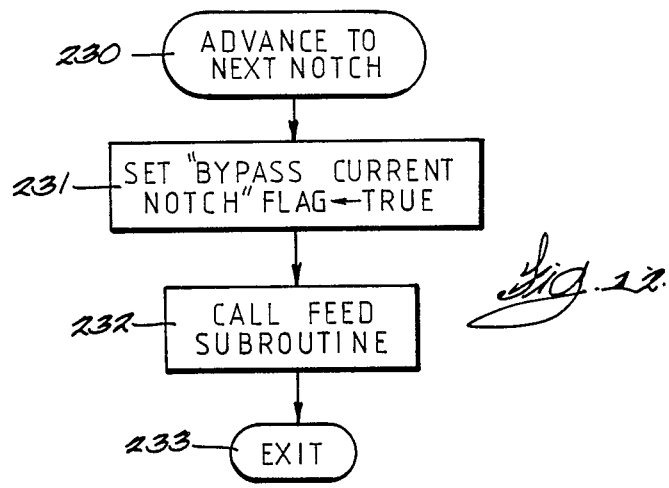
FIG. 12 is a flow chart of the ADVANCE TO NEXT NOTCH subroutine which executes on the microprocessor depicted in FIG. 11.
Figure 13:
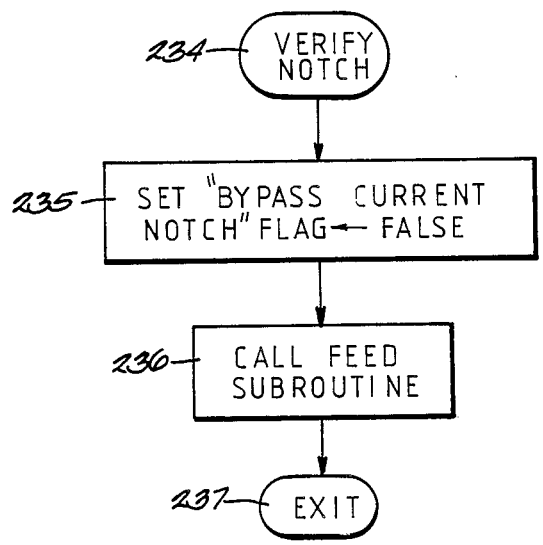
FIG. 13 is a flow chart of the VERIFY NOTCH subroutine which executes on the microprocessor depicted in FIG. 11.

Referring to FIGS. 12 and 13, the two types of indexing are described above are implemented, respectively, as an ADVANCE TO NEXT NOTCH subroutine 230 and a VERIFY subroutine 234. These subroutines 230 and 234 may be called by printing routines such as, for example, those known in the prior art, to invoke the respective indexing operations of this invention.

The ADVANCE TO NEXT NOTCH and VERIFY NOTCH subroutines 230 and 234 operate similarly. The only difference between them is the setting of a BYPASS CURRENT NOTCH flag. If the BYPASS CURRENT NOTCH flag is set TRUE, as in block 231 of the ADVANCE TO NEXT NOTCH subroutine, then the web 7 is advanced to the next label 6 even if a label 6 is currently at the registration point.

Alternatively, if the BYPASS CURRENT NOTCH flag is set FALSE, as in block 235 of the VERIFY NOTCH subroutine, then a measurement is first made to determine if a label is currently positioned at the registration point. If so, then the web 7 is not advanced. Otherwise, the web is advanced until a label 6 is correctly positioned at the registration point ready for printing.

After setting the BYPASS CURRENT NOTCH flag appropriately, both the ADVANCE TO NEXT NOTCH subroutine 230 and the VERIFY NOTCH subroutine 234 call a FEED subroutine at blocks 232 and 236, respectively, to instigate the indexing operation. The FEED subroutine returns when the indexing operation is complete. The ADVANCE TO NEXT NOTCH subroutine exits at 233 and the VERIFY NOTCH subroutine exits at 237.

Figure 14:
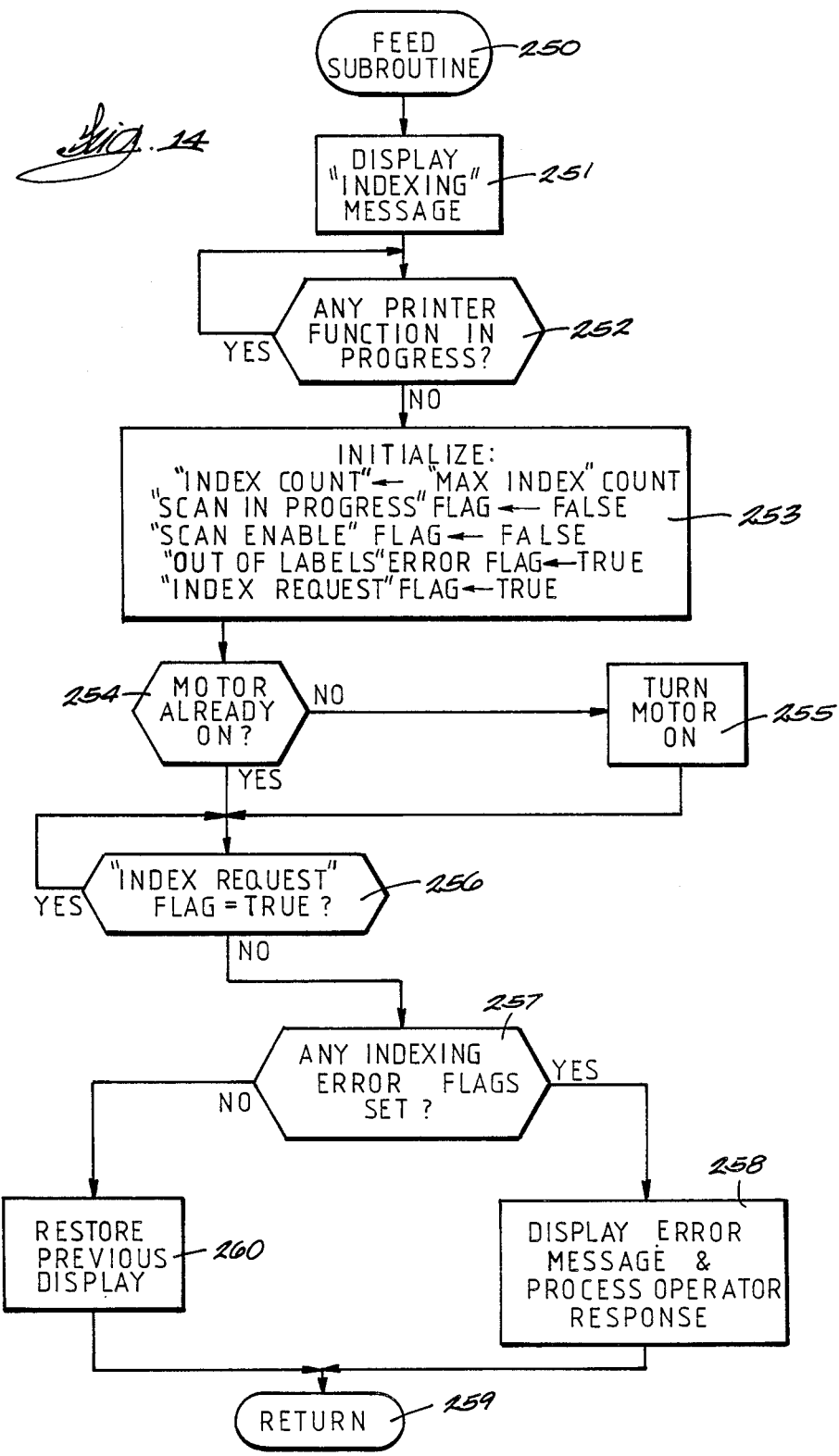
FIG. 14 is a flow chart of the FEED subroutine which is called by the routines depicted in FIGS. 12 and 13.

Referring to FIG. 14, the FEED subroutine enters at 250 and proceeds to block 251. In block 251, a message is displayed on the display 4 to indicate that the machine 1 is in the indexing mode. From block 251, processing proceeds to decision block 252.

At decision block 252, a wait loop is performed to insure that no printer functions, e.g. printing or line feeding, are currently in progress. When all outstanding printer functions have been completed, processing continues at block 253.

In block 253, a set of parameters are initialized to begin the indexing process. The parameters to be initialized include an INDEX count, SCAN IN PROGRESS and SCAN ENABLE flags, an OUT OF LABELS error flag, and an INDEX REQUEST FLAG. The INDEX REQUEST flag is used for communication with interupt driven routines described below to indicate that an indexing operation is in progress. The function of the remainder of these parameters is described in detail below in the sections pertinent to their use.

After performing the initializations in block 253, processing continues at decision block 254. In decision block 254, a test is made to determine if the motor 35 is already running. If it is not, then a branch is taken to block 255 where the motor 35 is energized. Processing then continues at decision block 256 either after turning the motor on in block 255 or if the motor 35 was already on in decision block 254.

In decision block 256, a test is made to determine if the INDEX REQUEST flag is still true. The control of the index processing is carried out by the TIMING SIGNAL INTERRUPT routine, described in detail below, which responds to interrupts from the TIMING signal 129. The INDEX REQUEST flag is initialized to TRUE in block 253. When the indexing process is completed by the TIMING SIGNAL INTERRUPT routine, the INDEX REQUEST flag is set FALSE.

At decision block 256, a wait loop is performed, continually testing the INDEX REQUEST flag. When the INDEX REQUEST flag is changed to FALSE upon completion of the indexing operation, a branch is taken to decision block 257.

In decision block 257, a test is made to determine if any of a number of indexing error flags have been set. The exact types of indexing error flags implemented by this invention are described in detail below. The indexing error flags are set by the interrupt driven routines to indicate errors detected during the indexing operation.

If any of the indexing error flags are found set at decision block 257, control transfers to block 258 where an appropriate error message is displayed on the display 4, instructing the operator to take corrective action. The operator may then respond with one or more of the function keys described above. From block 258, the FEED subroutine returns at 259.

If at decision block 257, no indexing error flags are set, then the indexing operation has been completed successfully. Control then transfers to block 260, where the text that was displayed prior to the "indexing" message is restored to the display 4. The FEED subroutine then returns at 259.

As mentioned above, the INDEX REQUEST flag is monitored in the TIMING SIGNAL INTERRUPT routine to determine when an indexing operation is to be performed. The TIMING SIGNAL INTERRUPT routine, in conjunction with other routines which it invokes, then carries out the actual process of indexing, clearing the INDEX REQUEST flag when done.

Figure 15:
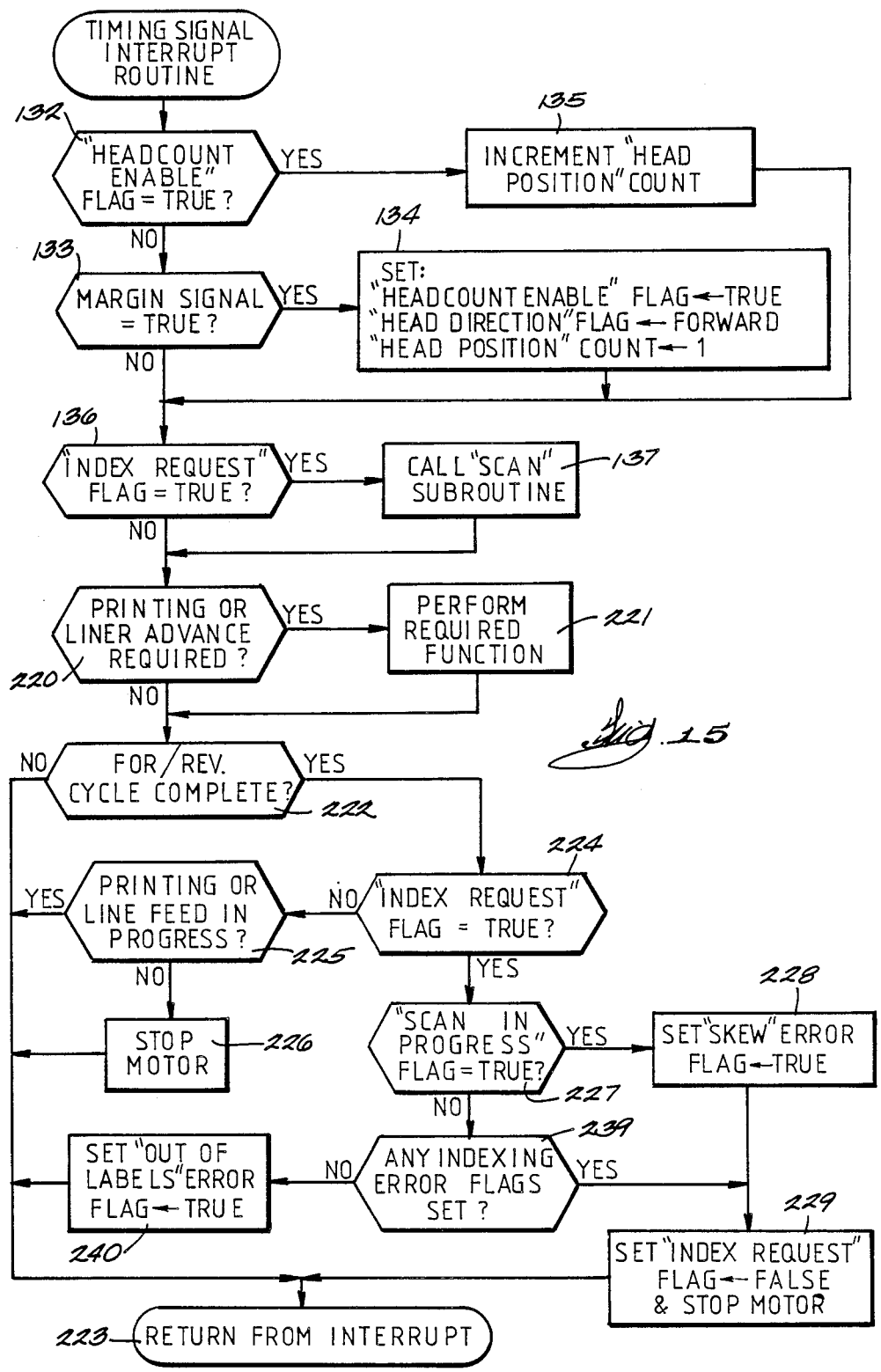
FIG. 15 is a flow chart of the TIMING SIGNAL INTERRUPT routine which executes on the microprocessor depicted in FIG. 11.

Referring to FIG. 15, the TIMING SIGNAL INTERRUPT service routine is entered at 130. From entry point 130 processing proceeds to block 132 where a HEAD COUNT ENABLE flag is tested. The HEAD COUNT ENABLE flag is used to indicate that the HEAD POSITION count has been initialized by detecting a MARGIN signal 120 at the left margin. Using this procedure, the HEAD POSITION count is always initialized at the same, precise reference position indicated by the activation of the margin signal 120.

If the HEAD COUNT ENABLE flag is not true, then the left margin has not yet been detected. In that case, processing proceeds to decision block 133 where the MARGIN signal 120 is tested to see if it has now become true. If so, processing proceeds to block 134 where the HEAD COUNT ENABLE flag is set true, a HEAD DIRECTION flag is set to "FORWARD" and the HEAD POSITION count is initialized to a value of "1".

If at decision block 132 the HEAD POSITION count had previously been initialized, the HEAD COUNT ENABLE flag will be true, and a branch to process block 135 is taken. In process block 135, the HEAD POSITION count is incremented.

After processing the HEAD POSITION count in blocks 132-135, a common exit is taken to decision block 136. In decision block 136 the INDEX REQUEST flag is examined. If at decision block 136, the INDEX REQUEST flag is true, a call is made to the SCAN subroutine 137. The SCAN subroutine 137 is a principle part of this invention which performs the actual width measurement of the web 7, checks the width of the web 7 against the configured size of the web 7, and controls indexing of the web to the beginning of the next label 6.

Figure 16:
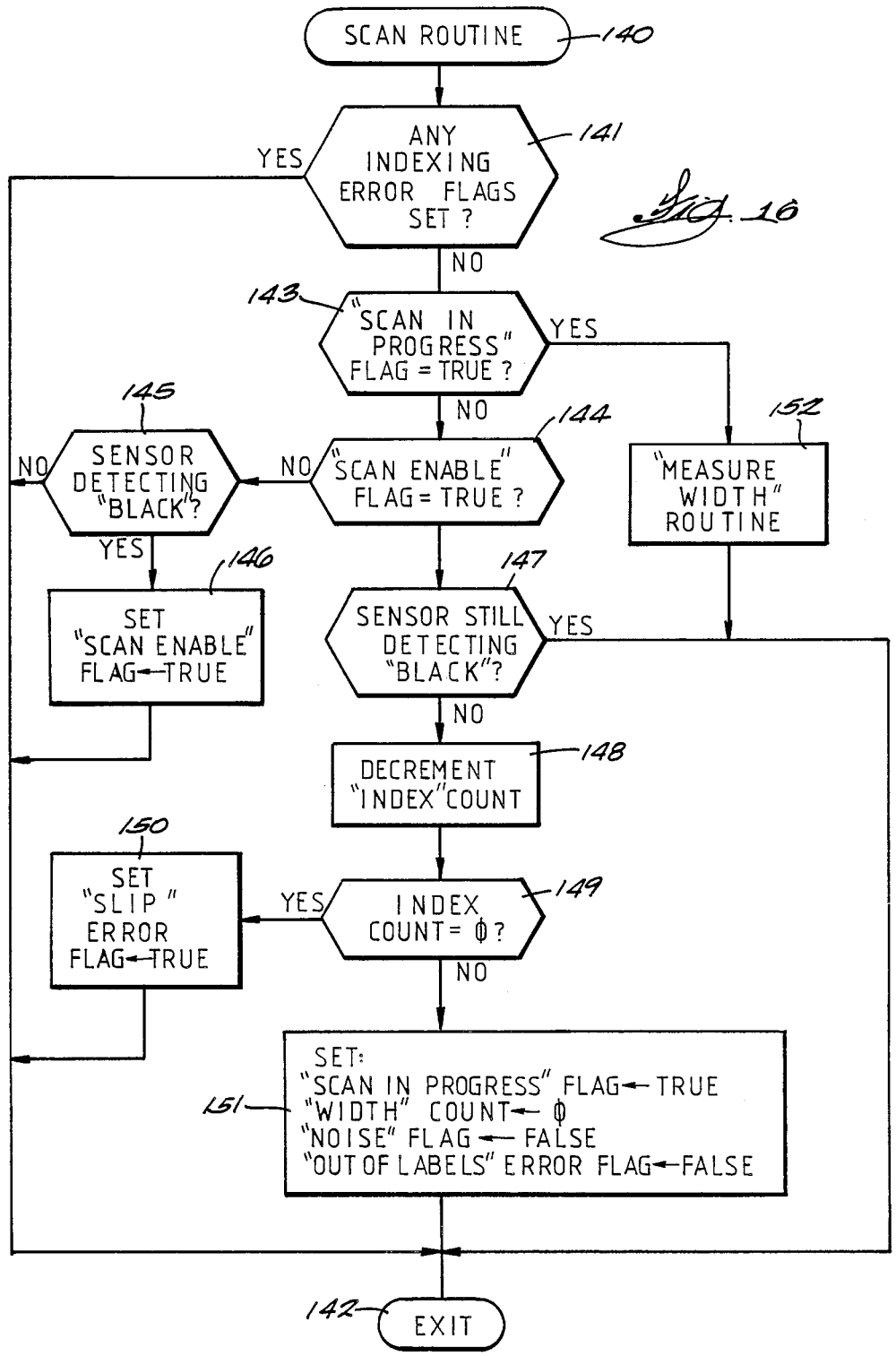
FIG. 16 is a flow chart of the SCAN subroutine which is called by the routine depicted in FIG. 15.

Referring now to FIG. 16, processing of the SCAN subroutine begins at block 140 and proceeds to decision block 141. At decision block 141 a test is made to determine if any of the indexing error flags are set. If so, the entire scan routine is bypassed to exit at 142. The indexing error flags are each described in detail below, and include:

A. SLIP error flag,
B. UNDERSIZE error flag,
C. OVERSIZE error flag,
D. OUT OF LABELS error flag, and
E. SKEW error flag.

If none of the indexing error flags are set, processing proceeds to decision block 143. At decision block 143, a test is made to see if a SCAN IN PROGRESS flag is set. The SCAN IN PROGRESS flag is used to indicate that a scan has been initialized.

A scan is the process of measuring the width of the web 7. Before the scan can begin, the web edge sensor 85 must first be detecting "black" before the leading edge of the web 7 is encountered. Then, upon detecting the "black" to "white" transition at the leading edge of the web 7, the scan is initialized and the SCAN IN PROGRESS flag is set.

If at decision block 143, the SCAN IN PROGRESS flag is not set, then the leading edge of the web 7 has not yet been detected, and processing continues at decision block 144. At decision block 144, a SCAN ENABLE flag is tested. The SCAN ENABLE flag is used to indicate that the first requirement for starting a scan has been fulfilled, e.g. that the web edge sensor 85 has detected "black" before encountering the web 7.

If the SCAN ENABLE flag is not set, it indicates that the web edge sensor 85 has not yet detected "black", and processing proceeds to decision block 145.

At decision block 145 the web edge sensor 85 is tested to determine if it is now detecting "black". If it is not, then the SCAN ENABLE flag remains reset, and a branch is taken to exit 142. If at decision block 145 the web edge sensor 85 is now detecting "black", then the SCAN ENABLE flag is set TRUE at process block 146. After process block 146, no further action is necessary for this pass through the SCAN subroutine, and a branch is taken to exit 142.

Back at decision block 144, if the SCAN ENABLE flag is set, then it indicates that the web edge sensor 85 had previously detected "black", and processing transfers to decision block 147. At decision block 147, a test is made to determine if the web edge sensor 85 is still detecting "black", e.g. whether the "black" to "white" transition at the edge of the web 7 has occurred.

If the web edge sensor 85 is still detecting "black", then the edge of the web 7 has not yet been encountered, and a branch is taken to exit 142. If at decision block 147 the web edge sensor 85 is no longer detecting "black", then a "black" to "white" transition has occurred at the edge of the web 7, and processing continues at process block 148.

In process block 148, an INDEX count is decremented. The INDEX count is initialized by the FEED subroutine in block 253 (FIG. 14) to a MAX INDEX count. The MAX INDEX count is a value equal to the maximum number of lines between notches 90 of the assembly. In this exemplary embodiment, that maximum value is 20, corresponding to the longest identification devices 6, 95 or 97 intended for use on the machine 1. The INDEX count is used to detect slippage of the web 7. If the INDEX count is decremented down to zero without finding a notch 90, then a SLIP error is flagged.

After decrementing the INDEX count in block 148, processing continues to decision block 149. In decision block 149, the INDEX count is tested to see if it has been decremented down to zero, e.g. the maximum number of lines have been scanned without finding a notch 90. If so, processing transfers to process block 150, where the SLIP error flag is set TRUE. From process block 150 a branch is taken to exit 142.

If at decision block 149, the INDEX count has not expired, then another scan is allowed. The new scan is initialized in process block 151 as follows. The SCAN IN PROGRESS flag is set to indicate that a scan is now in progress. A WIDTH count is used to contain the actual measurement of the width of the web 7, and is initialized to zero. As described above, each count of the WIDTH count corresponds to a distance of 0.0035 inches horizontally across the web 7.

Also in process block 151, a NOISE flag and NOISE count are initialized. The NOISE flag is used in a manner described in detail below to distinguish between the true opposite edge of the web 7 and a false indication of the web edge such as, for example, a tear in the web 7 or dark debris on the web 7 as represented at 215 in FIG. 18. Other false indications may arise from the edges of the labels 6 themselves on the web 7 if the label 6 is very thick. At this point, the NOISE flag is cleared and the NOISE count is initialized to zero. From process block 151, the SCAN subroutine exits at 142.

Finally, in block 151, the OUT OF LABELS error flag is set FALSE. As described above, the OUT OF LABELS error flag is initialized to TRUE. If an end of roll marker 99 is in place under the path of the web edge sensor 85, then a leading edge of the web 7 will not be detected, and the OUT OF LABELS error flag will remain TRUE. Since at block 151 a leading edge of the web 7 has been detected, the OUT OF LABELS error flag is set FALSE for this scan.

Once a scan has been initialized, on the next pass through the SCAN subroutine at decision block 143, the SCAN IN PROGRESS flag will be found to be set, and a branch is taken to a MEASURE WIDTH routine 152.

Figure 17:
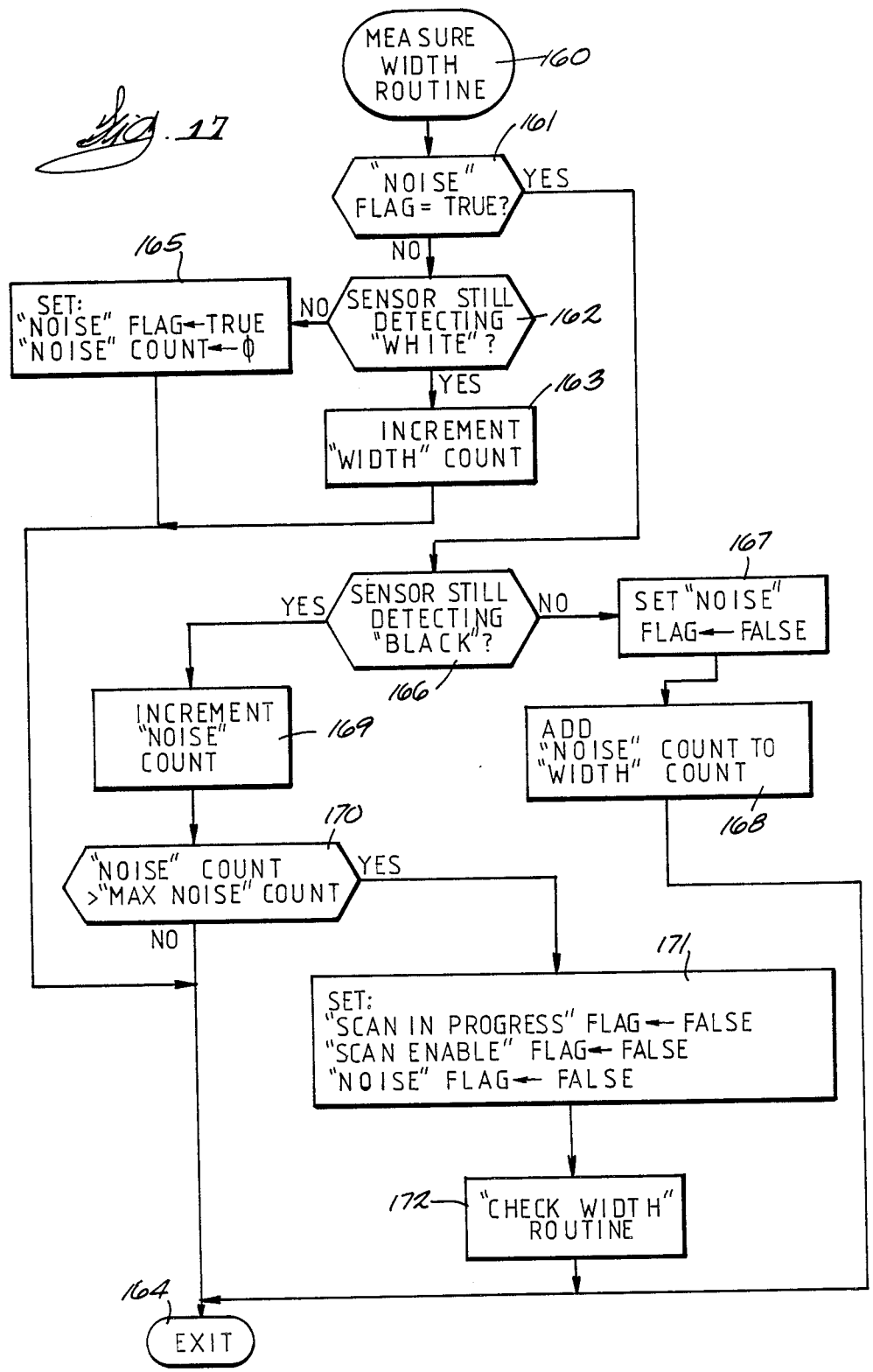
FIG. 17 is a flow chart of the MEASURE WIDTH routine which forms a part of the routine depicted in FIG. 16.

Referring to FIG. 17, the MEASURE WIDTH routine performs the actual measurement of the width of the web 7. Processing in the MEASURE WIDTH routine enters at block 160 and proceeds to decision block 161. At decision block 161 a test is made to determine if the NOISE flag is set. The noise detection logic operates as follows.

Upon first detecting a "white" to "black" transition, it has not been determined whether the "white" to "black" transition was caused by "noise", or the true trailing edge of the web 7. If the output of the web edge sensor 85 remains "black" for a predetermined number of counts, then it is assumed that the "white" to "black" transition was the true edge of the web 7.

Figure 18:
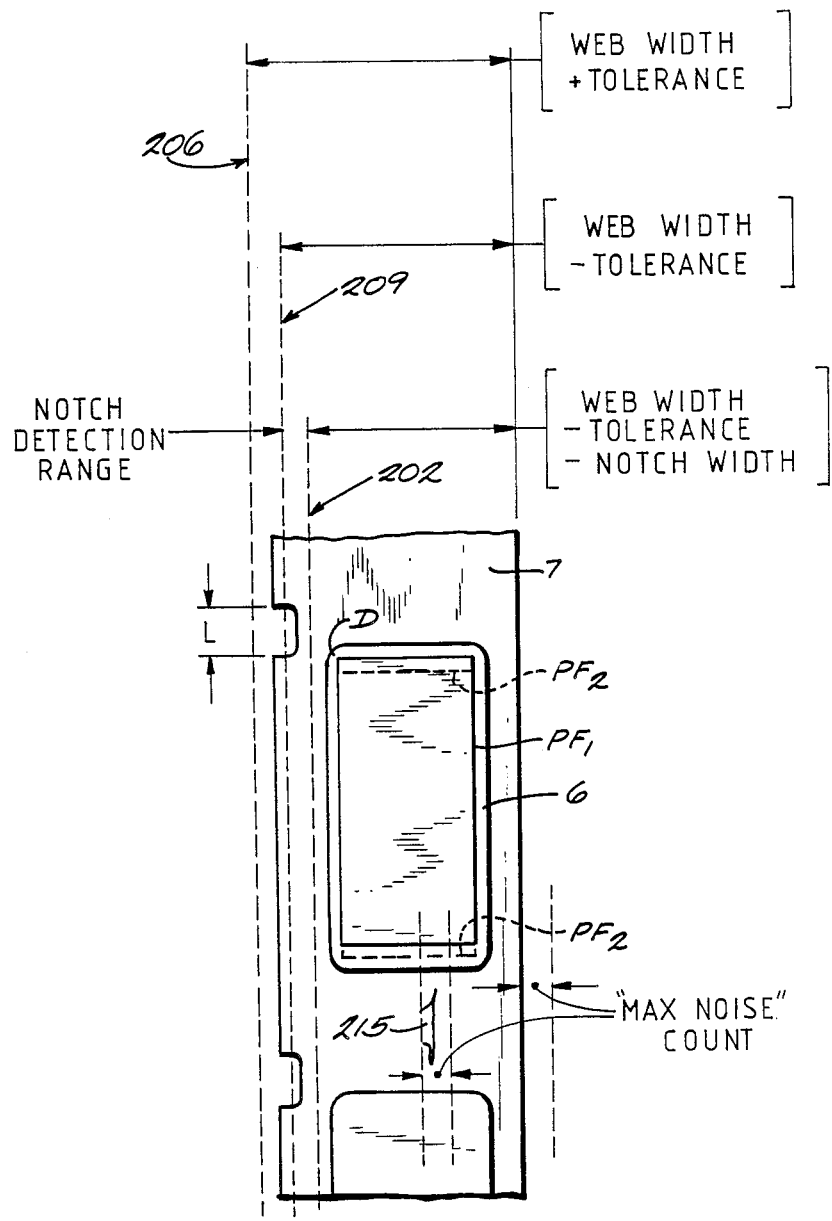
FIG. 18 is a detailed view of an assembly of devices useable with the machine of FIG. 1 showing the dimensions measured by the routines of FIGS. 15-18.

Referring momentarily to FIG. 18, the predetermined number of counts required to verify the true edge of the web 7 is designated as a MAX NOISE count. The actual number of counts used for the MAX NOISE count in this exemplary embodiment is 15, which corresponds to a distance: 0.0035 inch/count * 15 counts=0.052 inch. If a "white"-"black"-"white" transition occurs in fewer counts than the MAX NOISE count, then the transition is judged to be noise and not the true edge of the web 7.

When a "white" to "black" transition is detected, the NOISE flag is set. At the same time, the NOISE count is initialized to zero. For each pass through the MEASURE WIDTH routine that the web edge sensor 85 continues to detect "black", the NOISE count is incremented. The NOISE count is then compared against the MAX NOISE count. If a "white"-"black"-"white" transition occurs in fewer counts than the MAX NOISE count, then the transition is considered to be noise, and not the true edge of the web 7.

If on the other hand, a "white" to "black" transition occurs and another "white" edge is not detected before the MAX NOISE count has elapsed, then the transition is considered to be the true edge of the web 7.

Referring again to FIG. 17, if at decision block 161 the NOISE flag is not set, then the web edge sensor 85 had detected "white" on the previous pass through the MEASURE WIDTH routine, and processing proceeds to decision block 162. At decision block 162 a test is made to determine if the web edge sensor 85 is still detecting "white". If it is, then the WIDTH count is incremented at process block 163 and the MEASURE WIDTH routine then exits at 164.

If, on the other hand, the web edge sensor 85 at decision block 162 is no longer detecting "white", then a "white" to "black" transition has occurred, and a branch is made to process block 164.

At process block 164 the NOISE flag is set and the NOISE count is initialized to zero to begin a noise measurement cycle. After initiating the noise measurement cycle at process block 164, the MEASURE WIDTH routine exits at 164. On the next pass through the MEASURE WIDTH routine, the NOISE flag will be found to be set at decision block 161, and control transfers to decision block 166.

At decision block 166 a test is made to determine if the web edge sensor 85 is still detecting "black". If the web edge sensor 85 is no longer detecting "black", then a "white"-"black"-"white" transition has occurred before the MAX NOISE count has been exceeded, indicating that the transition was caused by noise rather than the true web edge. In that case, processing transfers to process block 167 where the NOISE flag can be cleared since the web edge sensor 85 is now in the "white" portion of the web 7 and noise processing is no longer in effect. From process block 167 control transfers to process block 168.

At process block 168, since the WIDTH count was not incremented during the noise processing, the NOISE count must be added into the WIDTH count to correct for the distance in which the noise measurement cycle was in effect. After performing this correction at process block 168, exit 164 is taken.

Back at decision block 166, if the web edge sensor is still detecting "black", then control transfers to process block 169 where the NOISE count is incremented. From process block 169, control transfers to decision block 170 where the NOISE count is tested to determine if it exceeds the MAX NOISE count. If not, then the noise measurement cycle continues and exit 164 is taken.

Conversely, if at process block 170 the NOISE count exceeds the MAX NOISE count, then it is presumed that the "white" to "black" transition that initiated the noise measurement cycle was a valid web edge, and processing continues at process block 171 At process block 171 the SCAN IN PROGRESS and SCAN ENABLE flags are reset to terminate the scan. At this point, the WIDTH count contains a count corresponding to the actual measured width of the web 7, since the WIDTH count is not incremented during noise measurement. Following process block 171, control transfers to block 172, where a CHECK WIDTH routine is performed to analyze the WIDTH count just completed.

Figure 19:
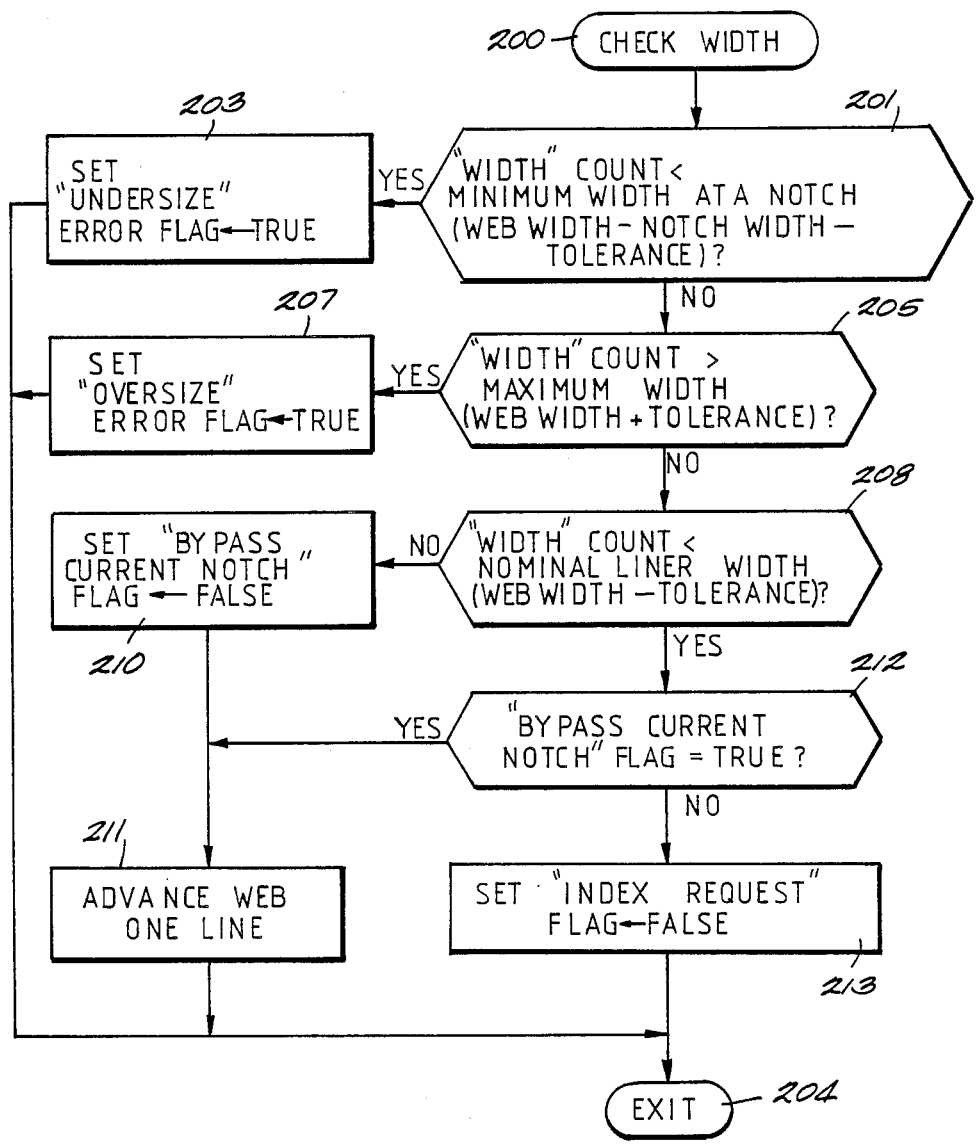
FIG. 19 is a flow chart of the CHECK WIDTH routine which forms a part of the routine depicted in FIG. 17.

Referring to FIGS. 18 and 19, the CHECK WIDTH routine processes the measured width of the web 7 indicated by the WIDTH count to determine (a) if the width of the web 7 is proper, and (b) if the web 7 is at a notch 90.

As described above, the web width may be configured by the operator to accommodate a variety of different web widths. In the CHECK WIDTH routine, a tolerance is allowed on either side of the web width in checking the web 7 for proper size. The width of the notch 90 is the same in webs 7 of all sizes, so that a difference in width, designated in FIG. 15 as the NOTCH DETECTION RANGE, can be used regardless of the web width.

It is a particular advantage of this invention that registration of the labels is achieved by discriminating between portions of the web 7 of different widths, rather than relying on a fixed feature. For example, the notch 90 can be on either side of the web 7 and still result in a width differential. In fact, notches 90 may be placed on alternating sides, and a width differential will still be detected. Further, any means of achieving a width differential in the web 7 may be used in this invention. For example, it should be apparent to one skilled in the art to modify the embodiments disclosed herein to detect a width differential using tabs (not shown) in place of notches, since it is a width differential that is detected, not any one particular feature.

The particular dimensions used in this exemplary embodiment are listed in the following table:

| DIMENSION | NO. OF COUNTS | CORRESPONDING DISTANCE |
| --- | --- | --- |
| Narrow Web Width | 214 | .750 inch |
| Medium Web Width | 357 | 1.25 inches |
| Wide Web Width | 500 | 1.75 inches |
| Tolerance | 14 | .049 inch |
| Notch Width | 26 | .091 inch |

Further, the length of the notch, designated as L in FIG. 18, must be of a length greater than one line feed plus the field of view of the web edge sensor 85 to ensure that it is not skipped over by a single line feed. For the printer mechanism in this exemplary embodiment, a line feed may vary from 0.125 to 0.140 inches. The field of view of the sensor 85 is 0.01 inches, and so the length L must be at least 0.15 inches.

The length L of the notch also has an effect on the registration of the printing on the label 6. This effect is due to the fact that the notch may be detected anywhere within the length L. A print field $PF_1$ is shown in FIG. 18 in the highest possible position on the label 6, corresponding to detection of the notch at an upper extreme of the length L. If the notch is not detected until later in the length L, the print field will be shifted downward on the label 6. For example, if the notch is detected at the lower extreme of the length L, then the print field will be shifted down to the position shown by dotted line $PF_2$ in FIG. 18. Therefore the length L of the notch is preferably chosen to be the minimum value, 0.15 inches in this exemplary embodiment, in order to minimize variation of placement of the print field on the label 6.

Printing is actually performed on the label 6 with respect to a datum point D at the upper left hand corner of the print field $PF_1$. The datum point and the left edge of the print field $PF_1$ are both aligned horizontally at a fixed, predetermined distance from the left edge of the web 7. Also, the datum point and the leading or top edge of the print field $PF_1$ are aligned vertically at a fixed, predetermined distance from the upper or leading edge of a notch 90. The width and length of the print field can be configured to correspond to a variety of label sizes. That is, since printing is referenced to the datum point D, labels 6 can be any size smaller than can be accommodated by a particular web width and notch spacing.

In this exemplary embodiment, several standard dimensions for print fields corresponding to labels of different standard sizes are stored in the ROM 103. With each standard size, there is also stored in the ROM 103 a configured width value, corresponding to the width of the web 7 expected to be loaded in the machine 1. The user may then specify, or configure, the size of the print field $PF_1$ in terms of the number of characters per line and the number of lines. From the configured size of the print field $PF_1$, the configured width value for the web 7 is then determined.

Referring now to FIGS. 18 and 19, the CHECK WIDTH routine enters at 200 and proceeds to decision block 201. At decision block 201 the WIDTH count is checked to see if it is less than the MINIMUM WIDTH AT A NOTCH, as indicated by dotted line 202 in FIG. 15. The MINIMUM WIDTH AT A NOTCH is defined as:

MINIMUM
WIDTH AT NOTCH = [WEB WIDTH − TOLERANCE − NOTCH WIDTH]

If the WIDTH count is less than the MINIMUM WIDTH AT A NOTCH 202, then a branch is taken to process block 203, where the UNDERSIZE ERROR flag is set. From process block 203, the CHECK WIDTH routine exits at 204.

If, at decision block 201, the WIDTH count is greater than or equal to the MINIMUM WIDTH AT A NOTCH 202, control transfers to decision block 205. At decision block 205 the WIDTH count is tested to see if it is greater than the MAXIMUM WIDTH, represented by dotted line 206 in FIG. 15. The MAXIMUM WIDTH is defined as:

*MAXIMUM WIDTH = [WEB WIDTH + TOLERANCE]*

If the WIDTH count is greater than the MAXIMUM WIDTH, then control transfers to process block 207 where the OVERSIZE ERROR flag is set before exiting at 204. If at decision block 205 the WIDTH count is less than or equal to the count corresponding to the MAXIMUM WIDTH, then control transfers to decision block 208.

At decision block 208, the WIDTH count is tested to determine if it is less than the WEB WIDTH minus the TOLERANCE as indicated by a dotted line 209 of FIG. 15. If not, then the width is outside of the NOTCH DETECTION RANGE, and control transfers to process block 210. In other words, the web width is nominal.

At decision block 210, if the indexing operation started at a notch, the notch has now been bypassed, since the web width is now nominal, and the BYPASS CURRENT NOTCH flag is set FALSE. This mechanism ensures that if an indexing operation is started on a notch 90, the notch 90 is bypassed completely to full nominal web width before seeking the next notch.

After setting the BYPASS CURRENT NOTCH flag at block 210, control transfers to block 211. At block 211, a pulse is produced on the CLUTCH SOLENOID output line 125 to cause the web 7 to advance to the next line. From block 211, the CHECK WIDTH routine exits at 204.

Back at decision block 208, if the WIDTH count does fall within the NOTCH DETECTION RANGE, then a notch 90 has been found, and control transfers to decision block 212. In decision block 212, the BYPASS CURRENT NOTCH flag is tested. The BYPASS CURRENT NOTCH flag at this point can be false for two possible reasons. First, if the indexing operation was invoked by the VERIFY NOTCH subroutine (FIG. 13), then the BYPASS CURRENT NOTCH was set FALSE as described above. Secondly, if the indexing operation was invoked by the ADVANCE TO NEXT NOTCH subroutine (FIG. 12), then the BYPASS CURRENT NOTCH flag is set FALSE in block 210 when full nominal web width is detected.

In either case, if the BYPASS CURRENT NOTCH flag is TRUE, a branch is taken to block 211 to advance another line. If the BYPASS CURRENT NOTCH flag is FALSE, then the notch 90 that is now found completes the indexing operation. Then in block 213 the INDEX REQUEST flag is cleared to signal completion of the indexing operation. From block 213, the CHECK WIDTH routine exits at 204.

As described above, the net outcome of the SCAN, MEASURE WIDTH, and CHECK WIDTH routines is either the successful indexing of the web 7 to the next notch 90, or the setting of an appropriate error flag. Referring back now to FIG. 15, the SCAN subroutine returns upon its completion to decision block 220. Decision block 220 is alternatively entered if the INDEX REQUEST flag was not set at decision block 136, bypassing the SCAN subroutine.

At decision block 220, the HEAD POSITION count is examined to determine if the carriage 71 is in a position to either energize the appropriate dot solenoids for printing, or to advance the web 7 (e.g. line feed). If either function is required, it is performed at block 221.

If printing is required at block 221, it is performed in the normal manner, by decoding the desired text to be printed into vertical dot columns. The dot solenoids corresponding to the current horizontal position as determined by the HEAD POSITION count are then energized. In this exemplary embodiment, vertical dot columns are printed every fourth count of the HEAD POSITION count (0.0035 inch * 4 = 0.014 inch).

One special feature of the printing performed in block 221, however, is included in this invention. After the last line of text for the current device 6 is printed, the ADVANCE TO NEXT NOTCH subroutine is called by the printing routine. As previously described, this will cause the web 7 to be advanced to the top of the next identification device 6.

Also as noted above, the setting of the INDEX REQUEST flag at the completion of an identification device 6 is not the only way in which the INDEX REQUEST flag is set. The INDEX REQUEST flag may be set by other programs whenever it is desired to advance to the top of an identification device 6, for example, in response to depression of the FEED key by the operator.

In blocks 220 and 221, web advancement takes place at both the right margin (HEAD POSITION count indicates helix at turn-around point) or after completing the reverse line (HEAD POSITION count beyond left edge of web 7 in reverse direction). An exception is that if the operator has selected "bold" printing, the web advancement at the right margin is suppressed and the same text is printed in reverse, offset by one dot position to create the "bold" effect. If the carriage 71 is found to be at the helix turn-around point, the HEAD DIRECTION flag is set to REVERSE.

After processing the print functions in blocks 220 and 221, processing continues at decision block 222. In decision block 222, the HEAD POSITION count is examined. If it has not yet reached the count corresponding to the left edge of the web 7 in the reverse direction, then the forward/reverse cycle is not yet complete and a return from the TIMING SIGNAL INTERRUPT routine is taken at 223. Otherwise, the forward/reverse cycle is complete, and a branch is taken to decision block 224.

At decision block 224, the INDEX REQUEST flag is checked. If it is not set, then indexing is not currently active, and control transfers to decision block 225. At decision block 225, a test is made to determine if either printing is in progress (text buffer not yet empty) or a line feed has been commanded (clutch solenoid engaged). If neither of these conditions exist, as would be the case after the carriage 71 has passed the left edge of the web 7 in the reverse direction but has not yet encountered the left margin, then the return from interrupt at 223 is taken. Otherwise, the printing, line feed, and indexing have all been completed, and the motor 35 is stopped at 226 before returning at 223.

Back at decision block 224, if the INDEX REQUEST flag is TRUE, then an indexing operation is in progress, and control transfers to decision block 227. At decision block 227, the SCAN IN PROGRESS flag is tested. If it is TRUE, then the trailing edge of the web 7 has not yet been detected, and a branch is taken to block 228. This condition is typically caused by the web 7 "creeping" too far to the left. Therefore, in block 228, the SKEW error flag is set TRUE to indicate the error.

From block 228, processing proceeds to block 229. Since an error has just been detected, the indexing operation is terminated by setting the INDEX REQUEST flag FALSE and stopping the motor 35. A branch is then taken to the RETURN FROM INTERRUPT block 223.

Back at decision block 227, if the SCAN IN PROGRESS flag is FALSE, as is the normal case, processing continues at decision block 239. In decision block 239, the indexing error flags are checked. If they are all clear, then no indexing errors were detected. In that case, control transfers to block 240. At block 240, the OUT OF LABELS error flag is again set TRUE in preparation for another scan, as described above, before returning at 223.

If, back at decision block 239, any of the indexing error flags are set, then an indexing error has been detected, and a branch is taken to block 229. At block 229, the INDEX REQUEST flag if cleared to terminate the indexing operation, and the motor 35 is stopped. Then the return from interrupt 223 is taken.

CONCLUSION

There has thus been described an electronic apparatus for providing identification devices with imprinted indicia, which apparatus includes a printing mechanism, feed means for advancing as assembly of identification devices, input means for the user to designate indicia to be printed on the devices, memory means storing a program of instructions to control the operation of the apparatus and read the user-designated indicia, and a microprocessor interfaced with the memory means and mechanical elements of the machine. The present invention provides an improved apparatus of this type in which the printing mechanism includes a printhead that is driven transversely back and forth across the width of an assembly of identification devices in the machine and a web edge sensor is attached to the printhead for transverse movement concurrently therewith, and further in which an assembly of identification devices loaded in the apparatus is especially configured to define two different transverse or width dimensions and the programmed instructions respond to signals generated by the web edge sensor upon transverse movement across the assembly to measure the preselected width dimensions and include instructions to control feed of the assembly through the apparatus and the application of printed indicia to individual identification devices of the assembly.

Assemblies of identification devices of the present invention do not have longitudinal edge holes such as are used with a tractor feed system. Instead, the assemblies are driven by feed rollers, and the present invention provides a system for obtaining accurate registration of individual identification devices vis-a-vis the printhead in a web drive system of the feed roller type, which is inherently subject to imprecise web advancement. The identification devices can be labels, wire markers, sleeves, tags, and the like, in any selected shape. In the illustrative assemblies of identification devices described above, notches 90 are shown as the means for defining two different width dimensions of the assemblies. Alternate constructions will be apparent to those skilled in the art, for example, the notches can be formed on a side of an assembly other than as illustrated above, be formed on both sides of an assembly and alternate with one another, or the notches can be formed on both sides of the assembly in transverse alignment with each other; it is also possible to replace the notches with tabs that project from one or more sides of an assembly.

The end of roll marker in the assemblies described above is a particularly useful feature in that it is used to halt printing as previously described, but also serves to prevent damage to the printhead and prevent overprinting of an identification device that has already been printed, typically the identification device preceding the end of roll marker.

A retro-reflective optical sensor is now considered to be a most useful type of web edge sensor to be employed with the present invention as it is fully capable of meeting the objectives of this invention, although it is expected that other web edge sensors can be used. The optical sensor has capabilities that enable further enhancements, if so desired, such as reading a bar code applied at the leading end of an assembly of identification devices that will contain suitable information with respect to size, etc., which the sensor can detect and generate signals that, with appropriate programmed instructions, can be used to automatically set operating parameters for the apparatus. Also, the sensor is capable of verifying a proceeding printed line or part of a printed line.

Still other changes can be made in the exemplary embodiments that are within the scope of the present invention. A dot matrix printhead has been described but other printheads suitable for microprocessor control can be employed, such as a daisy wheel or ink jet printer. Also, an LED display may be used instead of LCD display described above. Changes to these and other elements of the invention as described above are intended to be encompassed within the scope of the appended claims.

I claim:

1. In apparatus for providing identification devices with imprinted indicia of the type including (1) a printing mechanism, (2) friction feed means for advancing an assembly of a plurality of individual identification devices through the printing mechanism, (3) input means for designating indicia to be printed on individual identification devices, (4) memory means storing a program of instructions for reading the designated indicia, controlling the feed means and controlling the printing mechanism, and (5) microprocessor means responsive to the program of instructions in the memory means and interfaced to control the printing mechanism and the feed means, the improvement wherein:
  (1) the printing mechanism includes a printhead driven transversely back and forth across an assembly of identification devices loaded in the machine;

(2) a web edge sensor is attached to the printhead for concurrent transverse movement therewith, and the web edge sensor produces a signal connected to the microprocessor for indicating the presence or absence of the assembly edges under the current position of the web edge sensor;

(3) a continuous assembly of identification devices loaded in the apparatus for advancement by the feed means has opposed longitudinal edges with portions defining a preselected first width dimension of the assembly and portions defining a preselected second width dimension associated with each identification device of the assembly, wherein each second width dimension is different than the first width dimension; and (4) the program of instructions stored in the memory means includes a first set of instructions responsive to the signal generated by the web edge sensor upon transverse movement across the assembly of identification devices for measuring a current width dimension of the assembly along the path of transverse movement of the web edge sensor, and further including a second set of instructions to control the feed means for advancing the assembly to a position where one of the identification devices is in registration for printing by detecting the position at which the measured current width dimension of the assembly is within a preselected tolerance of the second width dimension.

2. The apparatus of claim 1 in which the printing mechanism provides a timing signal connected to the microprocessor, the timing signal producing a pulse for each incremental transverse movement of the printhead, and the first set of microprocessor instructions measure the current width dimension by maintaining a WIDTH count representing the number of pulses occurring on the timing signal while the signal from the web edge sensor indicates that the web edge sensor is positioned over the assembly.

3. The apparatus of claim 2 in which the first set of instructions includes noise filter means for determining the distance that the web edge sensor is positioned over the assembly, wherein the noise filter means compensates for any portion of the distance in which the signal from the web edge sensor indicates an absence of the assembly for less than a predetermined number of pulses on the timing signal.

4. The apparatus of claim 1 in which:
(a) the second width dimension is less than the first width dimension by a fixed, predetermined amount, thereby forming a notch with a fixed, predetermined notch width in the assembly;
(b) a configured width value is stored in the memory means, the configured width value representing a nominal width expected for the first width dimension of the assembly; and
(c) the first set of instructions includes width checking means for comparing the current width dimension with a maximum width limit and a minimum width limit, the maximum width limit being defined as the configuration width value plus a tolerance value and the minimum width value being defined as the configuration width value minus the notch width minus the tolerance value, wherein if the current width dimension is outside of the range defined by the maximum and minimum width limits then the width checking means generates an error condition to terminate advancing of the assembly.

5. The apparatus of claim 4 in which the apparatus is capable of being loaded with any one of a plurality of different assemblies, each assembly having a different first width dimension, and in which the configured width value is configurable by the input means to be set to a value corresponding to the assembly loaded.

6. The apparatus of claim 4 wherein the registration position for each identification device corresponds to a position where the notched portion of the assembly is under the path of transverse movement of the web edge sensor and the detection of the current width dimension is made in the width checking means by determining if the current width dimension is in a notch detection range defined by the range of widths from the configured width value minus the tolerance value to the minimum width limit.

7. The apparatus of claim 1 in which the assembly includes an end of roll marker which prevents detection of the assembly by the web edge sensor for at least one entire length between extreme limits of horizontal travel of the web edge sensor, and in which the first set of instructions includes means for generating an OUT OF LABELS error condition to terminate advancing of the assembly if an entire length between extreme limits of horizontal travel is completed without having the signal from the web edge sensor indicate the presence of the assembly.

8. The apparatus of claim 7 in which the feed means is located before the web edge sensor along the path taken by the assembly through the printer mechanism, and in which the end of roll marker is positioned on the assembly at a distance from the trailing end of the assembly, the distance being greater than the length of the path through the printer mechanism from a point where the assembly exits the feed means to a line defined by the horizontal travel of the web edge sensor, wherein the assembly is still engaged by the feed means when the end of roll marker is under the path of the web edge sensor.

9. The apparatus of claim 1 in which the feed means comprises a friction type mechanism which advances the assembly by executing discrete advancements equal to one line of printed text upon command from the microprocessor, and in which the second set of instructions includes slip detection means for detecting slippage of the assembly in the feed means by maintaining an INDEX count of the number of advancements executed by the feed means while advancing to the registration position, wherein if the INDEX count exceeds a predetermined maximum index count, then the slip detection means generates a slip error condition to terminate advancement of the assembly.

10. An assembly of identification devices for use in apparatus according to claim 1, 2, 3, 4, 5, 6, 7, 8 or 9 wherein:
the assembly comprises a carrier web and a plurality of adhesive labels releasably adhered to the carrier web and spaced from one another longitudinally along the carrier web;
the assembly includes a first width dimension defined by opposed longitudinal edges of the carrier web and the portions of the longitudinal edges defining a preselected second width dimension consist of notches defined in the carrier web, there being one such notch associated with each adhesive label of the assembly, and the second width dimension is less than the first width dimension of the assembly; and said first and second width dimensions of the assembly are stored in the memory means.

11. An assembly of identification devices for use in apparatus according to claim 1, 2, 3, 4, 5, 6, 7, 8 or 9, wherein:

the assembly comprises a base web and a top web seamed together along a plurality of transverse seams to define individual tubular marker sleeves;

the assembly includes a first width dimension defined by opposed longitudinal edges of one of said webs and the portions of the longitudinal edges defining a preselected second width dimension consist of notches defined in one of said webs, there being one such notch associated with each marker sleeve of the assembly, and the second width dimension is less than the first width dimension of the assembly; and said first and second width dimensions of the assembly are stored in the memory means.

* * * * *